United States Patent
Honda et al.

(10) Patent No.: US 11,095,196 B2
(45) Date of Patent: Aug. 17, 2021

(54) MANUFACTURING METHOD OF MOTOR CORE, MANUFACTURING METHOD OF ROTOR CORE, AND MANUFACTURING METHOD OF ROTOR

(71) Applicant: Nidec Corporation, Kyoto (JP)

(72) Inventors: Takeshi Honda, Kyoto (JP); Hiroshi Kitagaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 280 days.

(21) Appl. No.: 16/325,434

(22) PCT Filed: Sep. 29, 2017

(86) PCT No.: PCT/JP2017/035491
§ 371 (c)(1),
(2) Date: Feb. 14, 2019

(87) PCT Pub. No.: WO2018/062489
PCT Pub. Date: Apr. 5, 2018

(65) Prior Publication Data
US 2019/0214890 A1 Jul. 11, 2019

(30) Foreign Application Priority Data

Sep. 30, 2016 (JP) .............................. JP2016-195217

(51) Int. Cl.
*H02K 15/10* (2006.01)
*H02K 15/03* (2006.01)
(Continued)

(52) U.S. Cl.
CPC ............... *H02K 15/03* (2013.01); *H02K 1/22* (2013.01); *H02K 1/27* (2013.01); *H02K 1/276* (2013.01);
(Continued)

(58) Field of Classification Search
CPC ........ H02K 15/02; H02K 1/276; H02K 15/03; H02K 1/27; Y10T 29/49009;
(Continued)

(56) References Cited

U.S. PATENT DOCUMENTS 8,138,650 B2    3/2012  Shiga et al.
8,519,588 B2    8/2013  Amrhein et al.
(Continued)

FOREIGN PATENT DOCUMENTS

JP          5-9148 U         2/1993
JP      2006-352973 A       12/2006
(Continued)

OTHER PUBLICATIONS

Official Communication issued in International Patent Application No. PCT/JP2017/035491, dated Dec. 5, 2017.
(Continued)

*Primary Examiner* — Thiem D Phan
(74) *Attorney, Agent, or Firm* — Keating & Bennett

(57) ABSTRACT

A manufacturing method of a motor core includes laminating in an axial direction steel plates extending in a radial direction with respect to a central axis, each of the laminate steel plates including a base portion on a radially outer side of the central axis, annular portions separately disposed on a radially outer side of the base portion with penetrating portions therebetween, and connecting portions at predetermined intervals in a circumferential direction to extend in the radial direction and connect the base portion and the annular portions, the annular portions including coupling portions adjacent to both circumferential sides of the connecting portions, and cutting at least one of the two coupling portions adjacent to one connecting portion in the circumferential direction from an outer side to an inner side of the
(Continued)

laminate steel plates in the radial direction with respect to the laminate steel plates that are laminated.

7 Claims, 31 Drawing Sheets

(51) Int. Cl.
  *H02K 1/27* (2006.01)
  *H02K 1/22* (2006.01)
  *H02K 15/02* (2006.01)

(52) U.S. Cl.
  CPC ........ *H02K 15/02* (2013.01); *Y10T 29/49012* (2015.01)

(58) Field of Classification Search
  CPC ......... Y10T 29/49012; Y10T 29/49078; Y10T 29/49075; Y10T 29/53143; Y10T 29/49069
  USPC .......................... 29/598, 418, 596, 609, 738
  See application file for complete search history.

(56) References Cited

U.S. PATENT DOCUMENTS

| | | | |
|---|---|---|---|
| 8,935,845 B2 | 1/2015 | Blanc et al. | |
| 9,431,883 B2 | 8/2016 | Matsubayashi et al. | |
| 9,496,761 B2 * | 11/2016 | Haga .................... | H02K 1/2773 |
| 9,559,572 B2 | 1/2017 | Fang et al. | |
| 9,705,368 B2 * | 7/2017 | Schreiber ............... | H02K 1/274 |
| 9,871,419 B2 | 1/2018 | Yabe et al. | |
| 2017/0317544 A1 | 11/2017 | Watanabe et al. | |

FOREIGN PATENT DOCUMENTS

| | | |
|---|---|---|
| JP | 2013-81312 A | 5/2013 |
| JP | 2014-54155 A | 3/2014 |
| JP | 2015-163006 A | 9/2015 |

OTHER PUBLICATIONS

Migita et al., "Rotor Core, Rotor and Motor", U.S. Appl. No. 16/325,433, filed Feb. 14, 2019.

Migita et al., "Rotor Core, Rotor, Motor, Manufacturing Method of Rotor Core, and Manufacturing Method of Rotor", U.S. Appl. No. 16/325,435, filed Feb. 14, 2019.

Migita et al., "Rotor and Motor", U.S. Appl. No. 16/325,437, filed Feb. 14, 2019.

* cited by examiner

MANUFACTURING METHOD OF MOTOR CORE, MANUFACTURING METHOD OF ROTOR CORE, AND MANUFACTURING METHOD OF ROTOR

BACKGROUND OF THE INVENTION

1. Field of the Invention

The present invention relates to a manufacturing method of a motor core, a manufacturing method of a rotor core, and a manufacturing method of a rotor.

2. Description of the Related Art

Conventionally, a motor in which a rotor having a magnet and a shaft is disposed on a radially inner side of an annular stator having an excitation coil has been widely known. A plurality of magnets are arranged side by side at predetermined intervals in a circumferential direction. In this motor, magnetic flux flowing through the magnet and the coil may sometimes loop in the rotor during driving. In particular, a magnetic flux loop easily occurs in a region of a metal member (a laminated steel plate) positioned between the magnets adjacent to each other in the circumferential direction.

SUMMARY OF THE INVENTION

A manufacturing method of a motor core according to an example embodiment of the present disclosure is a manufacturing method of a motor core in which a plurality of laminate steel plates extending in a radial direction with respect to a central axis are laminated in an axial direction, the method including laminating the laminate steel plates in the axial direction, each of the laminate steel plates including a base portion positioned on a radially outer side of the central axis, annular portions which are separately disposed on a radially outer side of the base portion with penetrating portions therebetween, and a plurality of connecting portions arranged at predetermined intervals in a circumferential direction to extend in the radial direction and connect the base portion and the annular portions, the annular portions including coupling portions provided adjacent to both circumferential sides of the connecting portions, and cutting at least one coupling portion of two coupling portions adjacent to one connecting portion in the circumferential direction from an outer side to an inner side of the laminate steel plates with respect to the laminate steel plates that are laminated.

A manufacturing method of a rotor core according to an example embodiment of the present disclosure is a manufacturing method of a rotor core in which a plurality of laminate steel plates extending in a radial direction with respect to a central axis are laminated in an axial direction, the method including laminating the laminate steel plates in the axial direction, each of the laminate steel plates including a base portion positioned on a radially outer side of the central axis, annular portions which are separately disposed on a radially outer side of the base portion with penetrating portions therebetween, and a plurality of connecting portions which are arranged at predetermined intervals in a circumferential direction to extend in the radial direction and connect the base portion and the annular portions, the annular portions including coupling portions provided adjacent to both circumferential sides of the connecting portions, and cutting at least one coupling portion of two coupling portions adjacent to one connecting portion in the circumferential direction from an outer side to an inner side of the laminate steel plates in the radial direction with respect to the laminate steel plates that are laminated.

A manufacturing method of a rotor according to an example embodiment of the present disclosure is a manufacturing method of a rotor including a rotor core in which a plurality of laminate steel plates extending in a radial direction with respect to a central axis are laminated in an axial direction, and a plurality of magnets inserted into the rotor core, the method including laminating the laminate steel plates in the axial direction, each of the laminate steel plates including a base portion positioned on a radially outer side of the central axis, annular portions which are separately disposed on a radially outer side of the base portion with penetrating portions therebetween, and a plurality of connecting portions which are arranged at predetermined intervals in a circumferential direction to extend in the radial direction and connect the base portion and the annular portions, the annular portions including coupling portions provided adjacent to both circumferential sides of the connecting portions, cutting at least one coupling portion of two coupling portions adjacent to one connecting portion in the circumferential direction from an outer side to an inner side of the laminate steel plates in the radial direction with respect to the laminate steel plates that are laminated, and inserting the magnets into the penetrating portions.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Hereinafter, example embodiments of the present disclosure will be described in detail with reference to the drawings. In the specification, a direction in which a rotational axis of a motor extends is simply referred to as an "axial direction," a direction orthogonal to the rotational axis centering around the rotational axis of the motor is simply referred to as a "radial direction," and a direction along an arc centering around the rotational axis of the motor is simply referred to as a "circumferential direction." The central axis of the rotor core coincides with the rotational axis of the motor. Also, in the specification, for the sake of convenience of explanation, the axial direction is defined as a vertical direction, and a shape and a positional relationship of each part will be described with a depth direction of the sheet of FIG. 1 serving as the vertical direction of the rotor core, the rotor, and the motor. It should be noted that the definition in the vertical direction does not limit the direction when the motor is used. Also, in the specification, an end view parallel to the axial direction is referred to as a "longitudinal end view." In addition, the terms "parallel" and "vertical" used in the specification do not mean technically parallel or vertical, but include substantially parallel and substantially vertical.

Figure 1:
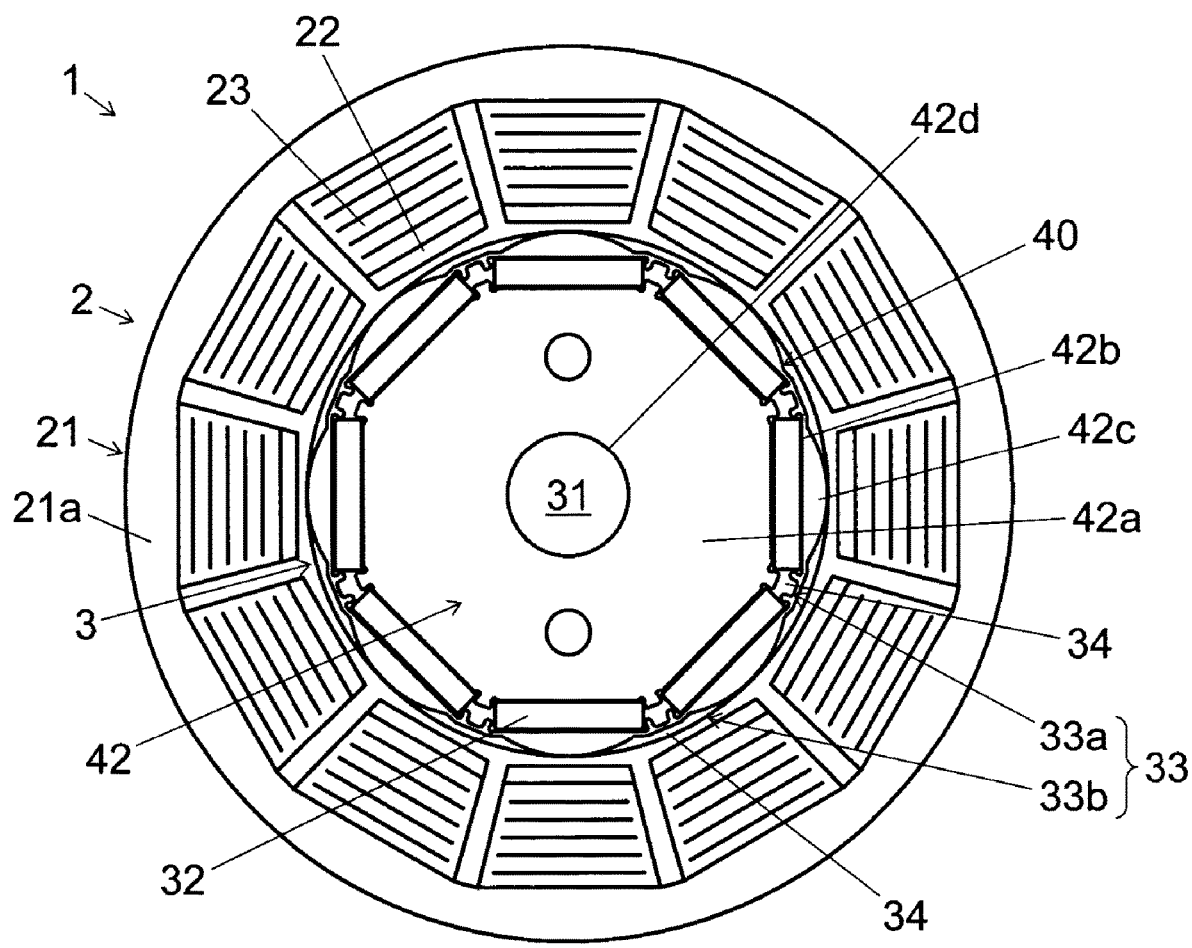
FIG. 1 is a plan view of a motor according to a first example embodiment of the present disclosure.

An overall configuration of a motor according to a first preferred embodiment of the present invention will be described. FIG. 1 is a plan view of a motor according to a preferred embodiment of the present invention. The motor 1 shown in FIG. 1 has a stator 2 and a rotor 3.

The stator 2 has, for example, a cylindrical or substantially cylindrical shape extending in the axial direction. The stator 2 is disposed with a predetermined gap provided radially outside the rotor 3. The stator 2 has a stator core 21, an insulator 22, and a coil 23.

The stator core 21 has a tubular or tubular shape extending in the axial direction. The stator core 21 is formed by laminating a plurality of magnetic steel plates in the axial direction. The stator core 21 has a core back 21a and teeth (not shown). The core back 21a has an annular or substantially annular shape. The teeth extend radially inward from an inner circumferential surface of the core back 21a. A plurality of teeth are arranged side by side at predetermined intervals in the circumferential direction.

The insulator 22 is provided to surround an outer surface of a tooth. The insulator 22 is disposed between the stator core 21 and the coil 23. The insulator 22 is made of, for example, an electrically insulating member made of a synthetic resin. The coil 23 is formed by winding a conductive wire around an outer circumference of the insulator 22.

The rotor 3 has a cylindrical or cylindrical shape extending in the axial direction. The rotor 3 is positioned with a predetermined gap provided radially inside the stator 2. The rotor 3 has a shaft 31, a rotor core 40, magnets 32, and space portions 33 or resin portions 34. The space portions 33 have column portions 33a and outer peripheral portions 33b.

The shaft 31 is a rotational axis of the motor 1. The shaft 31 has a columnar or columnar shape extending in a vertical direction. The shaft 31 is inserted into an upper bearing and a lower bearing (both not shown) provided on an upper side and a lower side of the rotor 3 and is rotatably supported thereon. The rotor 3 rotates around the shaft 31 extending in the vertical direction.

The rotor core 40 has a cylindrical or substantially cylindrical shape extending in the axial direction. The shaft 31 is inserted into hole portions 41d and 42d positioned at a radially central portion of the rotor core 40. The central axis of the rotor core 40 coincides with the shaft 31 of the motor 1. The rotor core 40 is formed by laminating, for example, a plurality of magnetic steel plates in the axial direction. Details of the rotor core 40 will be described later.

The magnet 32 is disposed radially inside an outer edge portion of the rotor core 40. A plurality of magnets 32 are arranged side by side at predetermined intervals in the circumferential direction. For example, eight magnets 32 are provided. The magnet 32 is a rectangular parallelepiped body having a substantially rectangular bottom surface and extending in the axial direction. An axial length of the magnet 32 substantially coincides with an axial length of the rotor core 40. The magnet 32 is supported by the rotor core 40.

The column portions 33a are provided between the magnets 32 adjacent to each other in the circumferential direction. For example, when there are eight magnets 32, the column portions 33a are provided at eight places. The column portion 33a is a space of a quadrangular column or substantially quadrangular column shape whose bottom surface has a trapezoidal or substantially trapezoidal shape and extends in the axial direction. The column portion 33a penetrates the rotor core 40 in the axial direction. By providing the column portion 33a, it is possible to more effectively utilize magnetic flux of the magnet 32 in the rotor 3.

The outer peripheral portions 33b are provided on outer sides in the radial direction of the column portions 33a. The outer peripheral portions 33b are provided at eight locations. The outer peripheral portions 33b have substantially semicircular bottom surfaces and extend in the axial direction.

The resin portions 34 are provided in the space portions 33. The resin portions 34 are provided by pouring a synthetic resin, an adhesive, etc. into a space portion 33 surrounded by an outer circumferential surface of the rotor core 40 and an inner circumferential surface of a metal mold (not shown) disposed radially outside the rotor core 40 at an outer edge portion of the rotor 3. As a result, the resin portions 34 play a role as a flux barrier.

Figure 2:
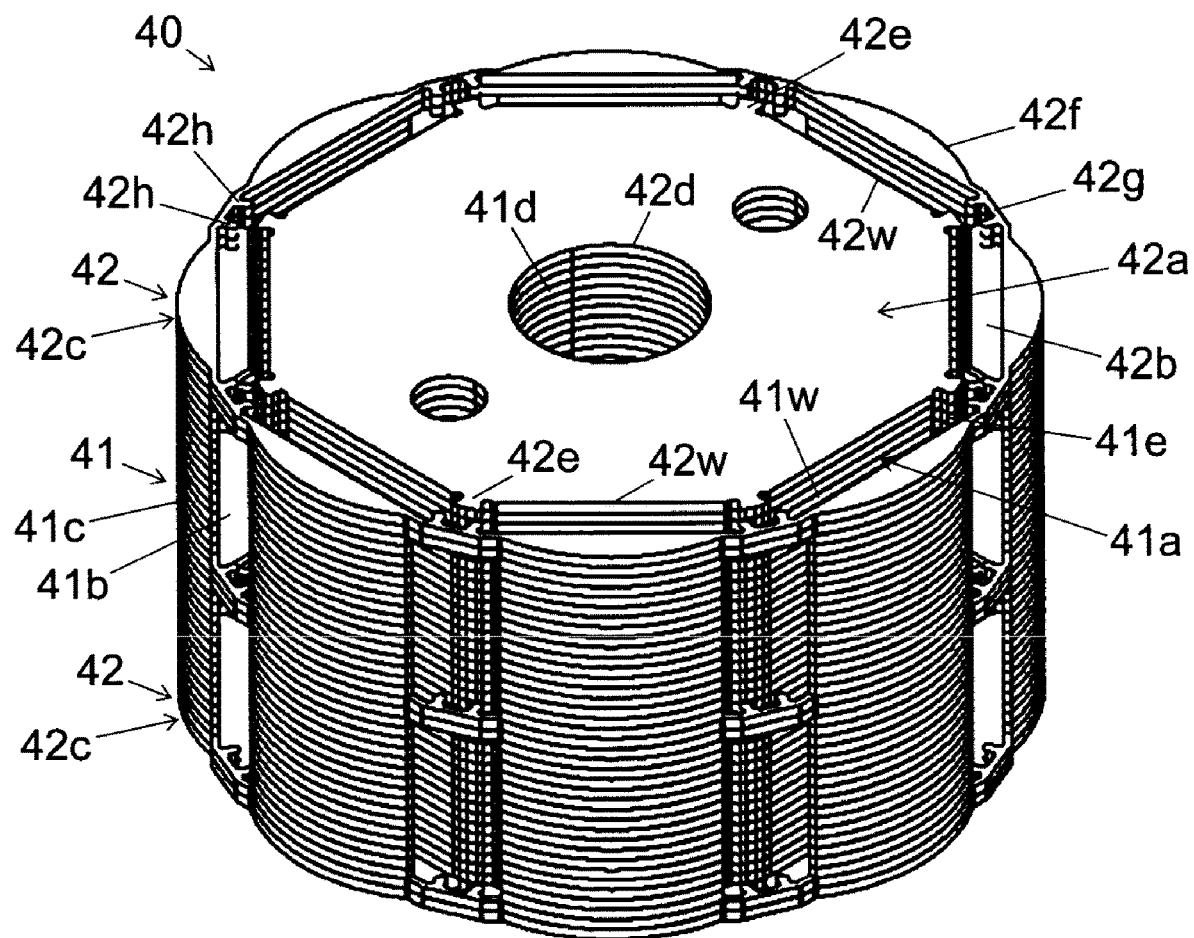
FIG. 2 is a perspective view of a rotor core of the motor according to the first example embodiment of the present disclosure as viewed from above.
Figure 3:
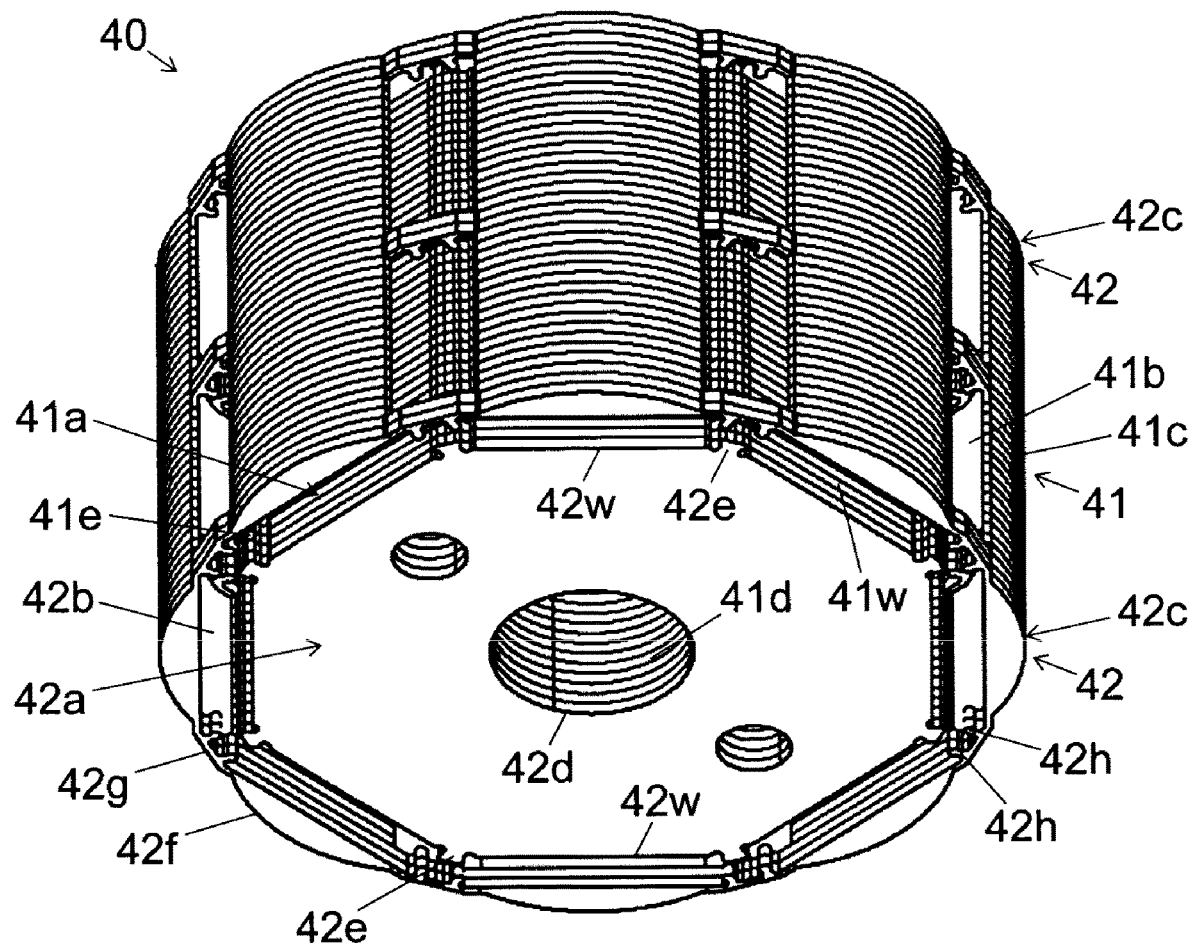
FIG. 3 is a perspective view of the rotor core of the motor according to the first example embodiment of the present disclosure as viewed from the below.
Figure 4:
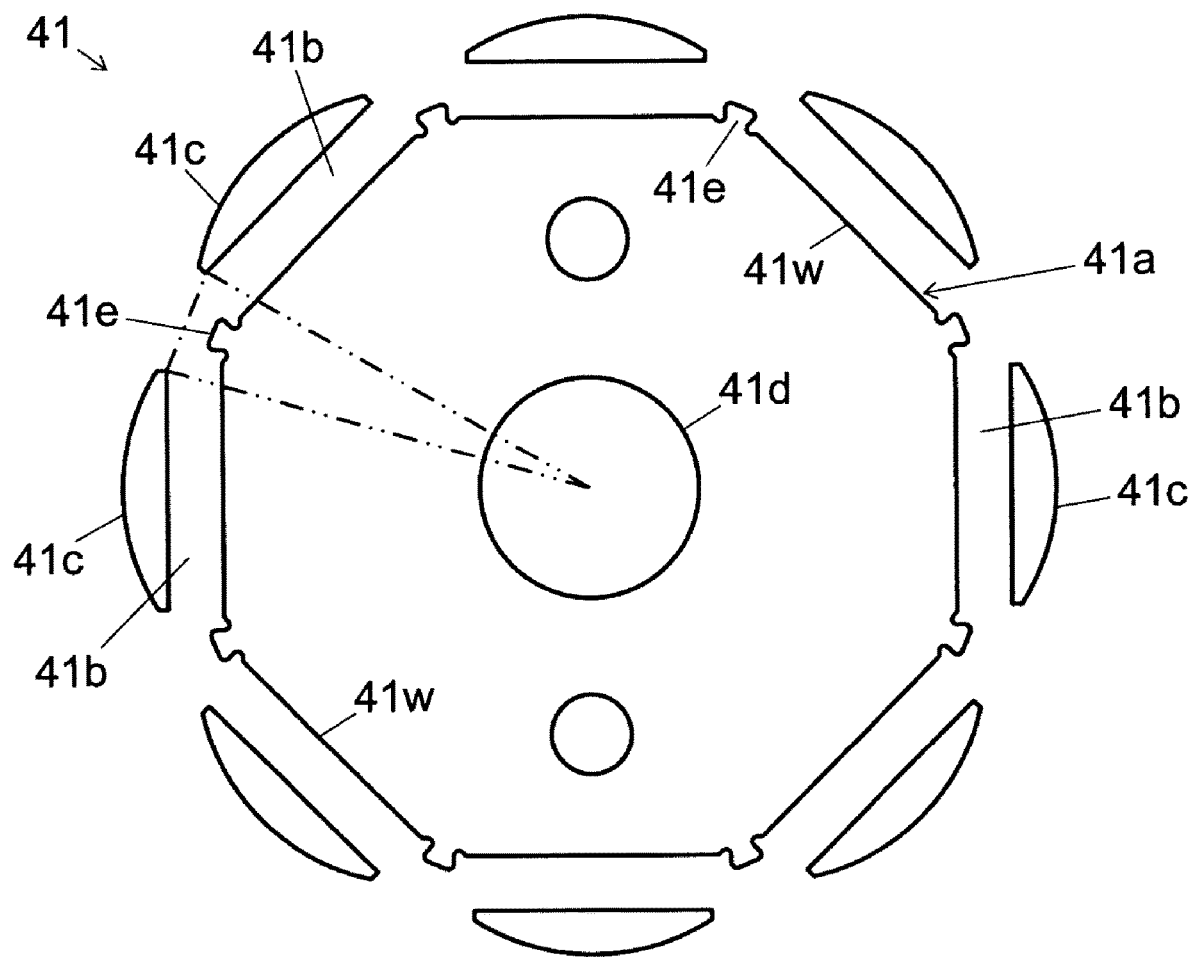
FIG. 4 is a plan view of a first laminate steel plate of the rotor core according to the first example embodiment of the present disclosure.
Figure 5:
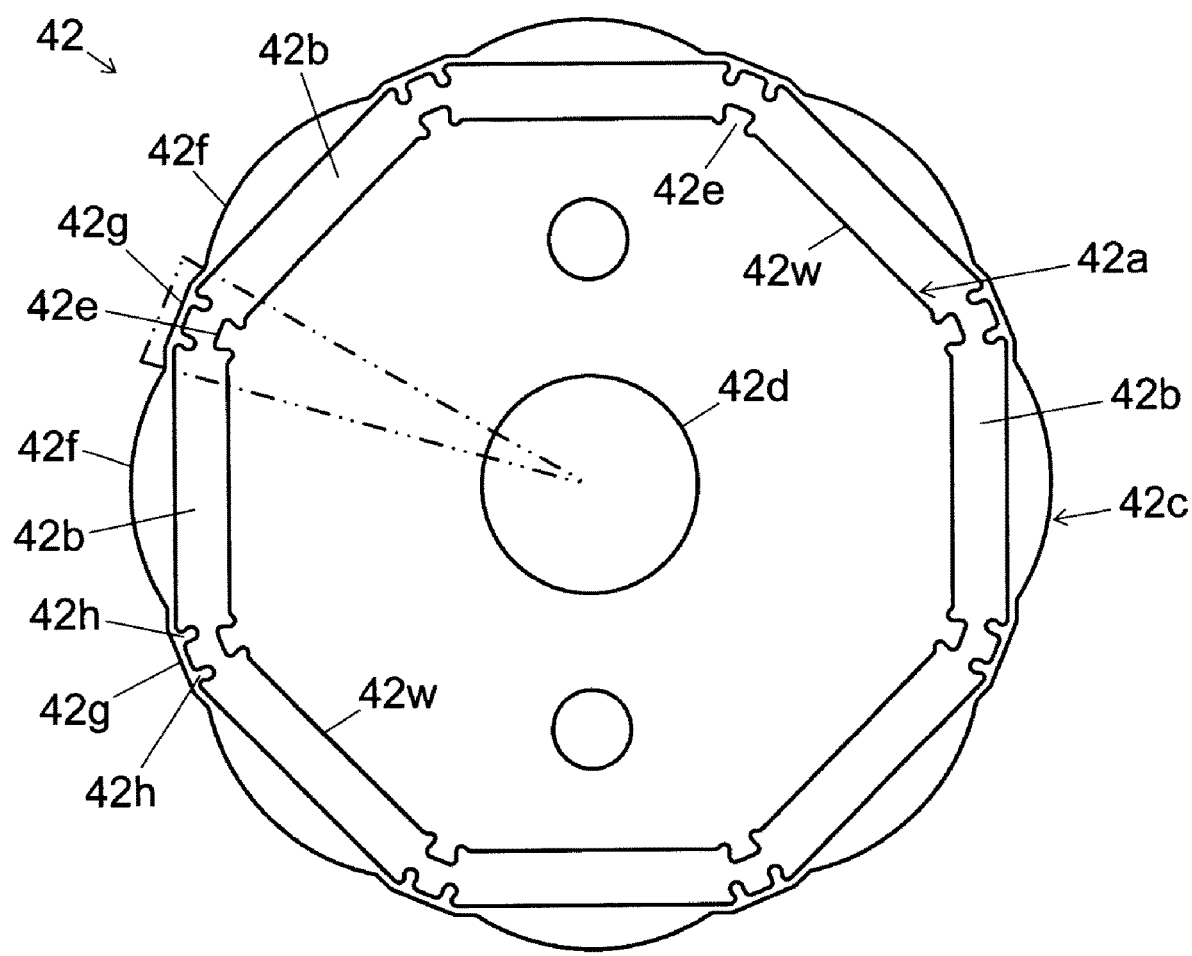
FIG. 5 is a plan view of a second laminate steel plate of the rotor core according to the first example embodiment of the present disclosure.

Subsequently, a detailed configuration of the rotor core 40 will be described. FIG. 2 is a perspective view of the rotor core of the motor 1 according to the first preferred embodiment of the present invention as viewed from above. FIG. 3 is a perspective view of the rotor core of the motor 1 according to the first preferred embodiment of the present invention as viewed from below. FIG. 4 is a plan view of a first laminate steel plate of the rotor core according to the first preferred embodiment of the present invention. FIG. 5 is a plan view of a second laminate steel plate of the rotor core according to the first preferred embodiment of the present invention.

The rotor core 40 shown in FIGS. 2 and 3 has first laminate steel plates 41 and second laminate steel plates 42. Each of the first laminate steel plates 41 and the second laminate steel plates 42 expands in the radial direction with respect to the central axis of the rotor core 40.

The first laminate steel plate 41 shown in FIG. 4 has a first base portion 41a, a penetrating portion 41b, and a piece portion 41c.

The first base portion 41a is positioned on a radially outer side of the central axis. An outer shape of the first base portion 41a is substantially octagonal. At the radially central portion of the first base portion 41a, there is a hole portion 41d through which the shaft 31 penetrates in the axial direction.

The penetrating portion 41b is provided on a radially outer side of each of eight edges of an outer edge portion 41w of the first base portion 41a. The penetrating portion 41b is formed as a gap between the first base portion 41a and the piece portion 41c. The magnets 32 are provided one by one in the eight penetrating portions 41b, respectively (see FIG. 1).

The piece portion 41c is separately disposed on a radially outer side of the first base portion 41a with the penetrating portion 41b therebetween. A plurality of the piece portions 41c are disposed at predetermined intervals in the circumferential direction. For example, eight piece portions 41c are provided radially outside the eight edges on the outer periphery of the first base portion 41a, respectively. The center of the piece portion 41c is shifted radially outward from the axis of the shaft 31 in its shape in a plan view, and the piece portion 41c is in a semicircular or substantially semicircular shape which has an arc with a radius smaller than the radius of the rotor 3 and a straight portion corresponding to a string positioned on a radially inner side of the arc. The straight portion on the radially inner side of the piece portion 41c is substantially parallel to the outer edge portion 41w of the first base portion 41a.

The first base portion 41a has protruding portions 41e. The protruding portions 41e are provided in angular regions with respect to the central axis between the piece portions 41c adjacent to each other in the circumferential direction. That is, the protruding portions 41e are provided in fan-shaped regions surrounded by circumferentially opposed end portions of the circumferentially adjacent piece portions 41c and the central axis, respectively. In other words, the protruding portions 41e are provided on the column portions 33a of the rotor 3. An example of the fan-shaped angular region with respect to the central axis between the circumferentially adjacent piece portions 41c is illustrated with a one-dot chain line in FIG. 4.

The protruding portion 41e protrudes radially outward from the outer edge portion 41w of the first base portion 41a. When the first base portion 41a is polygonal, the protruding portion 41e protrudes radially outward from each apex of the first base portion 41a. A protruding length of the protruding portion 41e is shorter than a width of the penetrating portion 41b in the radial direction. Since the first base portion 41a has the protruding portion 41e, when the magnet 32 is inserted between the first base portion 41a and the piece portion 41c, that is, the penetrating portion 41b, circumferential end portions of the magnet 32 can be brought into contact with the protruding portions 41e. Accordingly, it is possible to perform the positioning of the magnet 32 in the circumferential direction.

The second laminate steel plate 42 shown in FIG. 5 has a second base portion 42a, penetrating portions 42b, and annular portions 42c.

The second base portion 42a is positioned on a radially outer side of the central axis. An outer shape of the second base portion 42a is substantially octagonal. The outer shape of the second base portion 42a is substantially the same as the outer shape of the first base portion 41a. In a central portion of the second base portion 42a in the radial direction, there is a hole portion 42d through which the shaft 31 penetrates in the axial direction.

The penetrating portion 42b is provided on a radially outer side of each of eight edges on an outer periphery of the second base portion 42a. The penetrating portion 42b is formed as a gap between the second base portion 42a and a large diameter portion 42f of the annular portion 42c which will be described later. The magnets 32 are provided one by one in eight penetrating portions 42b, respectively (see FIG. 1).

The annular portion 42c is separately disposed on a radially outer side of the second base portion 42a with the penetrating portion 42b therebetween. The annular portion 42c extends in the circumferential direction. The annular portion 42c has a shape similar to a shape obtained by connecting the eight piece portions 41c of the first laminate steel plate 41 in an annular or substantially annular shape.

The annular portion 42c has a large diameter portion 42f and a small diameter portion 42g which have different outer diameters. In the annular portion 42c, the large diameter portion 42f and the small diameter portion 42g are alternately arranged in the circumferential direction. According to this configuration, magnetic saturation is likely to occur in the small diameter portion 42g. Therefore, it is possible to efficiently guide the magnetic flux, so that and generation of the magnetic flux loop inside the rotor core 40 can be suppressed.

In the axial direction, the large diameter portion 42f is disposed at the same position as the piece portion 41 of the first laminate steel plate 41. The large diameter portion 42f has a cutout circular or substantially cutout circular shape similar to that of the piece portion 41c in its shape in a plan view. The large diameter portion 42f is provided on a radially outer side of each of eight edges of the outer periphery of the second base portion 42a at eight positions, similarly to the piece portion 41c. A straight portion on a radially inner side of the large diameter portion 42f is substantially parallel to a side of the outer periphery of the second base portion 42a. An outer diameter of the large diameter portion 42f is larger than an outer diameter of the small diameter portion 42g.

In the axial direction, the small diameter portion 42g is disposed at the same position as a region between the piece portions 41 adjacent to each other in the circumferential direction of the first laminate steel plate 41. The small diameter portion 42g has a long plate or substantially long plate shape connecting the large diameter portions 42f adjacent in the circumferential direction in its shape in a plan view. The small diameter portion 42g connects end portions of two large diameter portions 42f to each other. The outer diameter of the small diameter portion 42g is smaller than the outer diameter of the large diameter portion 42f.

The small diameter portion 42g has projections 42h. The projections 42h extend radially inward from an inner circumferential surface of the small diameter portion 42g. According to this configuration, a strength of the annular portion 42c can be improved. Further, when the magnet 32 is inserted between the second base portion 42a and the annular portion 42c, that is, the penetrating portion 42b, circumferential end portions of the magnet 32 can be brought into contact with the projections 42h. In this way, it is possible to perform positioning of the magnet 32 in the circumferential direction. Also, a radial length of the projection 42h is shorter than a radial width of the penetrating portion 42b.

For example, two projections 42h are provided for one small diameter portion 42g. The two projections 42h provided in the one small diameter portion 42g are arranged in a circumferentially separated manner. According to this configuration, it is possible to widely use the region between the two projections 42h as a flux barrier. Therefore, it is possible to more effectively utilize the magnetic flux of the magnet. The number of the projections 42h is not limited to two, and may be one or three or more.

The second base portion 42a has protruding portions 42e. The protruding portion 42e are provided in angular regions with respect to the central axis where the small diameter portions 42g are positioned. In the case where the second base portion 42a is polygonal, the protruding portion 42e protrudes radially outward from each apex of the second base portion 42a. That is, the protruding portion 42e is provided in a fan-shaped region surrounded by both circumferential end portions of the small diameter portion 42g and the central axis. In other words, the protruding portion 42e is provided on the column portion 33a of the rotor 3. An example of the fan-shaped angular region with respect to the central axis where the small diameter portion 42g is positioned is illustrated with a one-dot chain line in FIG. 5.

In addition, as described above, the small diameter portion 42g is disposed at the same position as the region between the circumferentially adjacent piece portions 41c of the first laminate steel plate 41 in the axial direction. Therefore, as far as the rotor core 40 is concerned, the protruding portion 42e is provided in the angular region with respect to the central axis between the piece portions 41c adjacent to each other in the circumferential direction.

The protruding portion 42e protrudes radially outward from an outer edge portion 42w of the second base portion 42a. A tip portion of the protruding portion 42e faces the radially inner side of the small diameter portion 42g. The protruding portion 42e is disposed in a region between the two projections 42h with respect to the circumferential direction. A protruding length of the protruding portion 42e is shorter than a width of the penetrating portion 42b in the radial direction. In addition, the protruding portion 42e does not come into contact with the two projections 42h. Since the second base portion 42a has the protruding portion 42e, when the magnet 32 is inserted between the second base portion 42a and the annular portion 42c, that is, the penetrating portion 42b, the circumferential end portions of the magnet 32 can be brought into contact with the protruding portions 42e. Accordingly, it is possible to perform the positioning of the magnet 32 in the circumferential direction.

The rotor core 40 shown in FIGS. 2 and 3 is formed by laminating a plurality of first laminate steel plates 41 having the above structure and at least one second laminate steel plate 42 having the above structure in the axial direction. At this time, the piece portion 41c of the first laminate steel plate 41 and the large diameter portion 42f of the annular portion 42c of the second laminate steel plate 42 overlap in the axial direction, and the first laminate steel plate 41 and the second laminate steel plate 42 are laminated at a position where their outer peripheral edges are partially aligned. The first laminate steel plate 41 and the second laminate steel plate 42 are fixed, for example, by caulking or the like.

According to this configuration, there is no region of a steel plate over the entire region in the circumferential direction between the first base portion 41a of the first laminate steel plate 41 and the piece portion 41c and between the second base portion 42a and the annular portion 42c of the second laminate steel plate 42. In this way, a flux barrier such as an air layer can be provided between the first base portion 41a and the piece portion 41c and between the second base portion 42a and the annular portion 42c. Therefore, it is possible to more effectively utilize the magnetic flux of the magnet 32.

Since the number of the second laminate steel plates 42 is smaller than the number of the first laminate steel plates 41, it is possible to suppress an amount of magnetic flux flowing through the annular portion 42c of the entire rotor core 40 as compared to the case where the entire rotor core 40 is formed by the second laminate steel plates 42. Therefore, it is possible to more effectively utilize the magnetic flux of the magnet 32 in the annular portion 42c.

More specifically describing with respect to the laminated structure of the first laminate steel plates 41 and the second laminate steel plates 42, for example, two pieces of second laminate steel plates 42 are disposed at the upper end and the lower end in the axial direction of the rotor core 40, and a plurality of first laminate steel plates 41 are disposed between the second laminate steel plate 42 at the upper end in the axial direction and the second laminate steel plate 42 at the lower end in the axial direction. According to this configuration, it is possible to improve the strength of the rotor core 40. Further, for example, two second laminate steel plates 42 are disposed also in a middle portion of the plurality of first laminate steel plates laminated in the axial direction. According to this configuration, it is possible to further improve the strength of the rotor core 40.

The rotor core 40 may have such a configuration in which the first laminate steel plate 41 is disposed at each of the upper end and the lower end in the axial direction, and a plurality of second laminate steel plates 42 are disposed between the first laminate steel plate 41 at the upper end in the axial direction and the first laminate steel plate 41 at the lower end in the axial direction. In this rotor core 40, each of the upper end and the lower end in the axial direction is the first laminate steel plate 41. The rotor core 40 may have a structure of a plurality of first laminate steel plates 41, one or two second laminate steel plates 42, and a plurality of first laminate steel plates 41 in order from the top. In addition, the rotor core 40 may have a structure of a plurality of first laminate steel plates 41, one or two second laminate steel plates 42, a plurality of first laminate steel plates 41, one or two second laminate steel plates 42, and a plurality of first laminate steel plates 41 in order from the top.

In the rotor core 40 where the second laminate steel plate 42 is disposed at each of the upper end and the lower end in the axial direction, when the axial length of the magnet 32 is shorter than the axial length of the rotor core 40 in the rotor core 40 where the second laminate steel plate 42 is disposed at each of the upper end and the lower end in the axial direction, it may be considered that the annular portion 42c of the second laminate steel plate 42 positioned at the upper end is magnetically saturated and the annular portion 42c of the second laminate steel plate 42 positioned at the lower end is not magnetically saturated. At that time, there is a possibility that a difference in distortion amount occurs between an upper end portion and a lower end portion of a back electromotive voltage waveform in the coil 23 depending on presence or absence of magnetic saturation in the annular portions 42c at the upper end and the lower end. Therefore, by not providing the second laminate steel plate 42 at the upper end and the lower end of the rotor core 40, distortion of the back electromotive voltage waveform can be suppressed. Instead, by adopting a configuration in which a plurality of second laminate steel plates 42 are disposed between the first laminate steel plate 41 at the upper end in the axial direction and the first laminate steel plate 41 at the lower end in the axial direction, it is possible to prevent the first base portion 41a and the piece portion 41c from being separated from each other and the second base portion 42a and the annular portion 42c from being separated while effectively utilizing the magnetic flux of the magnet 32.

In the rotor 3 of the first preferred embodiment, by pressing the annular portion 42c of the second laminate steel plate 42 from the radially outer side, the magnet 32 can be held. Thus, the magnet can be held without providing the resin portion 34, so that the number of man-hours and materials can be reduced. Further, by pressing the small diameter portion 42g of the annular portion 42c, the column portion 33a can be eliminated. This makes it possible to hold the magnet more firmly and to make more effective use of the magnetic flux.

2.2. Second Preferred Embodiment

Figure 6:
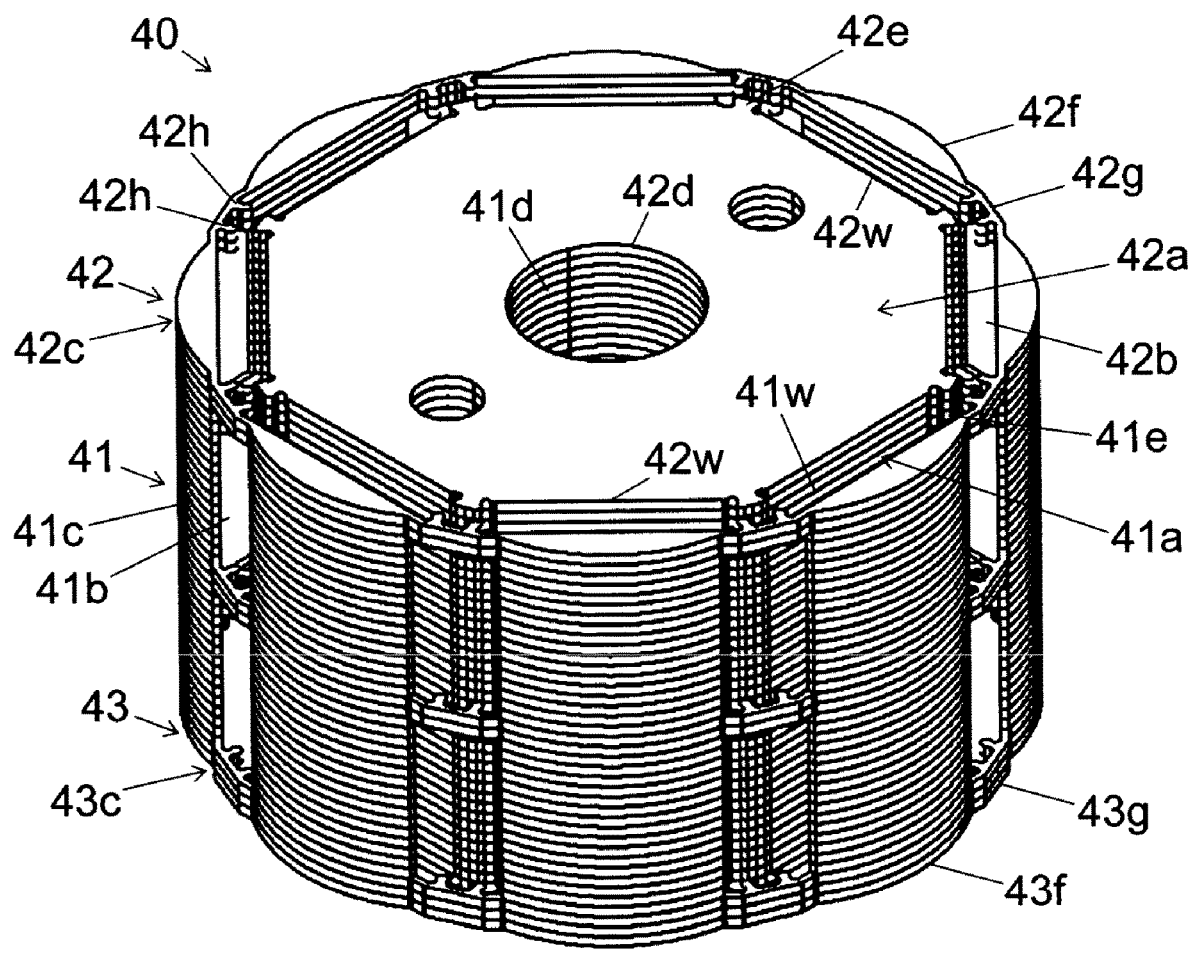
FIG. 6 is a perspective view of a rotor core of a motor according to a second example embodiment of the present disclosure as viewed from above.
Figure 7:
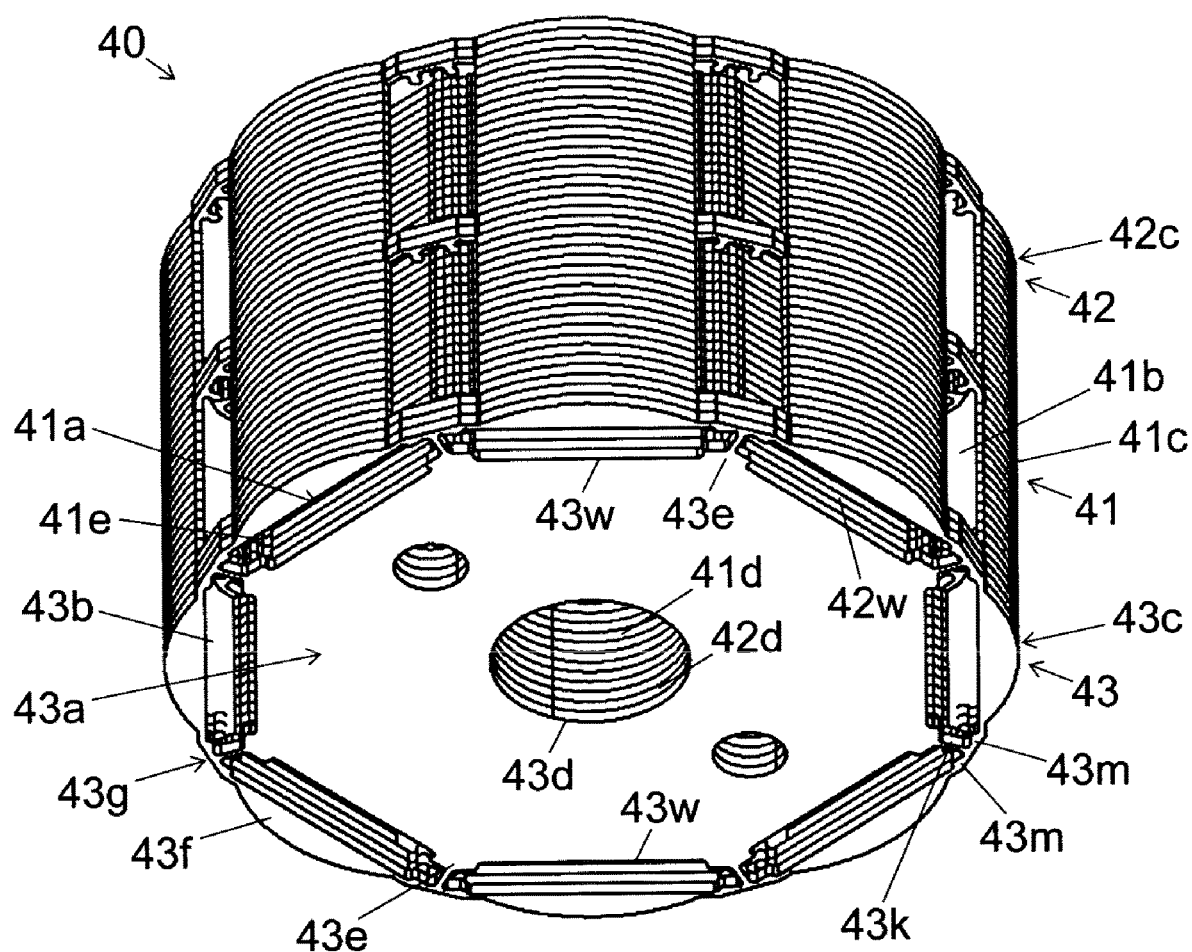
FIG. 7 is a perspective view of the rotor core of the motor according to the second example embodiment of the present disclosure as viewed from below.
Figure 8:
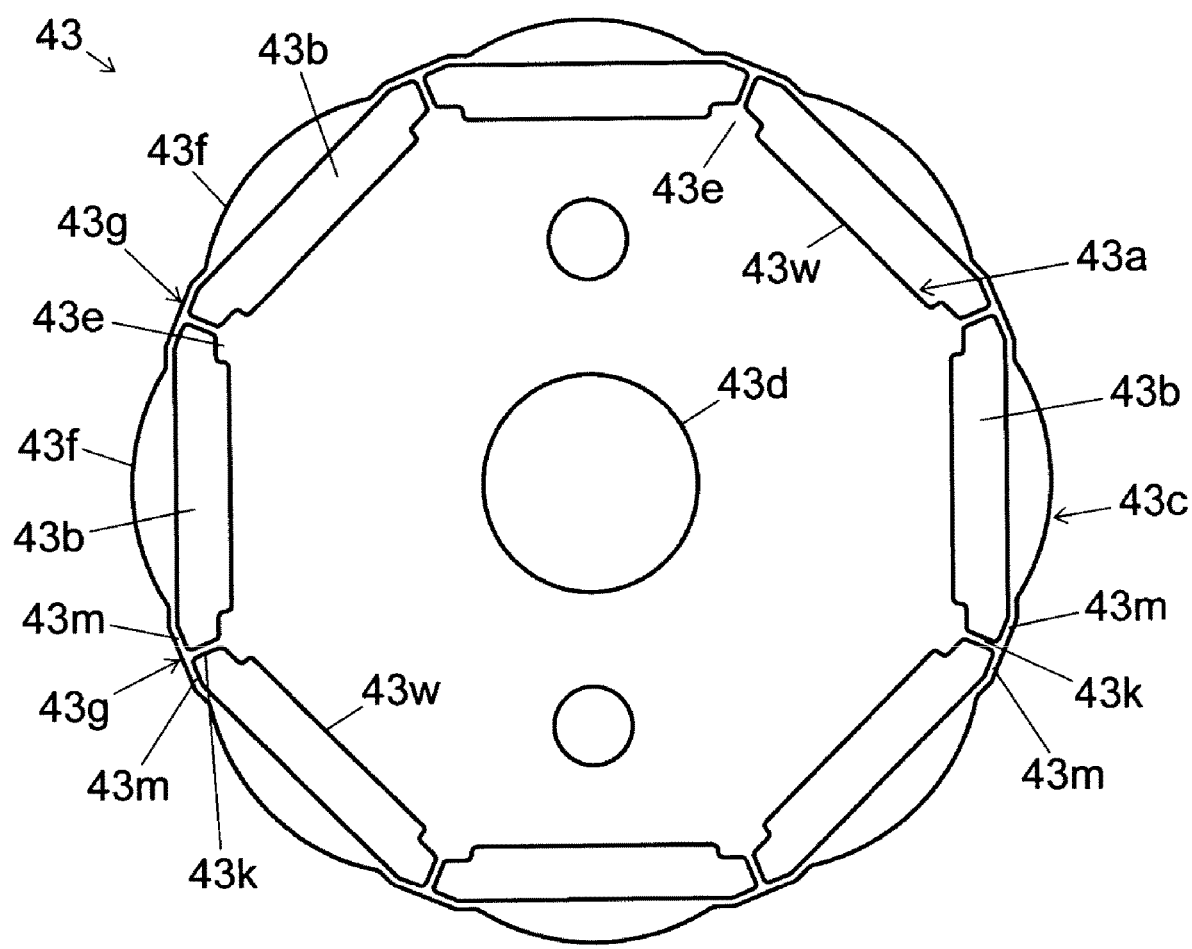
FIG. 8 is a plan view of a connected laminate steel plate of the rotor core according to the second example embodiment of the present disclosure.

Next, a motor according to a second preferred embodiment of the present invention will be described. FIG. 6 is a perspective view of a rotor core of the motor according to the second preferred embodiment of the present invention as viewed from above. FIG. 7 is a perspective view of the rotor core of the motor according to the second preferred embodiment of the present invention as viewed from below. FIG. 8 is a plan view of a connected laminate steel plate of the rotor core according to a second preferred embodiment of the present invention. Also, since a basic configuration of this embodiment is the same as that of the first preferred embodiment described above, constituent elements common to the first preferred embodiment are denoted by the same reference numerals or the same names as before, explanation thereof may be omitted.

The rotor core 40 shown in FIGS. 6 and 7 has a connected laminate steel plate 43 in addition to the first laminate steel plate 41 and the second laminate steel plate 42. Similarly to the first laminate steel plate 41 and the second laminate steel plate 42, the connected laminate steel plate 43 expands in the radial direction with respect to the central axis of the rotor core 40.

The connected laminate steel plate 43 shown in FIG. 8 has a connected base portion 43a, penetrating portions 43b, connected annular portions 43c, and connecting portions 43k.

The connected base portion 43a, the penetrating portion 43b, and the connected annular portion 43c have the same configuration as the second base portion 42a, the penetrating portion 42b, and the annular portion 42c of the second laminate steel plate 42, respectively. That is, the connected base portion 43a has a hole portion 43d and protruding portions 43e. The penetrating portion 43b is formed as a gap between the connected base portion 43a and a large diameter portion 43f of the connected annular portion 43c. The connected annular portion 43c has the large diameter portion 43f and a small diameter portion 43g which are different in outer diameter and are arranged alternately in the circumferential direction.

In addition, in this preferred embodiment, the protruding portion 43e of the connected laminate steel plate 43 is enlarged toward both circumferential sides more than the protruding portion 41e of the first laminate steel plate 41 and the protruding portion 42e of the second laminate steel plate 42. Also, a part of the protruding portion 43e of the connected laminate steel plate 43 overlaps the penetrating portion 41b of the first laminate steel plate 41 and the penetrating portion 42b of the second laminate steel plate 42. As a result, the magnet 32 inserted into the penetrating portion 41b and the penetrating portion 42b is caught by the protruding portion 43e. Therefore, it is possible to prevent the magnet 32 from downwardly falling off the rotor core 40.

The connecting portions 43k are disposed in regions between the connected base portion 43a and the connected annular portions 43c in the radial direction. The connecting portions 43k are disposed at predetermined intervals in the circumferential direction. The connecting portions 43k are disposed in regions between the adjacent penetrating portions 43b in the circumferential direction. The connecting portion 43k has an elongated plate shape extending in the radial direction in its shape in a plan view. The connecting portion 43k connects the connected base portion 43a and the connected annular portion 43c. More specifically, the connecting portion 43k connects a radially front end portion of the protruding portion 43e and an inner edge portion of the small diameter portion 43g.

The small diameter portion 43g has two coupling portions 43m. The coupling portions 43m are provided adjacent to both circumferential sides of the connecting portion 43k. That is, the small diameter portion 43g has two coupling portions 43m circumferentially adjacent to one connecting portion 43k connected to the inner edge portion thereof. The coupling portion 43m is connected to the large diameter portion 43f on a side opposite to a region connected to the connecting portion 43k.

In the rotor core 40 shown in FIG. 6 and FIG. 7, for example, one connected laminate steel plate 43 is disposed at the lower end in the axial direction. At this time, the piece portion 41c of the first laminate steel plate 41, the large diameter portion 42f of the annular portion 42c of the second laminate steel plate 42, and the large diameter portion 43f of the connected annular portion 43c of the connected laminate steel plate 43 overlap in the axial direction, and the first laminate steel plate 41, the second laminate steel plate 42 and the connected laminate steel plate 43 are laminated at a position where their outer edge portions are partially aligned.

According to this configuration, it is possible to further improve the strength of the rotor core 40. Furthermore, it is possible to prevent the first base portion 41a and the piece portion 41c from being separated from each other, and the second base portion 42a and the annular portion 42c from being separated.

The connected laminate steel plate 43 may be disposed at the upper end in the axial direction of the rotor core 40. Further, the connected laminate steel plates 43 may be disposed at both the lower end and the upper end in the axial direction of the rotor core 40. According to this configuration, it is possible to further increase the strength of the rotor core 40. In addition, the connected laminate steel plate 43 at the upper end and the connected laminate steel plate 43 at the lower end may have different shapes. For example, the upper end may be a connected laminate steel plate 43 having penetrating portions through which the magnets 32 are inserted, and the lower end may be a connected laminate steel plate 43 for preventing the magnets 32 from falling off.

Figure 9:
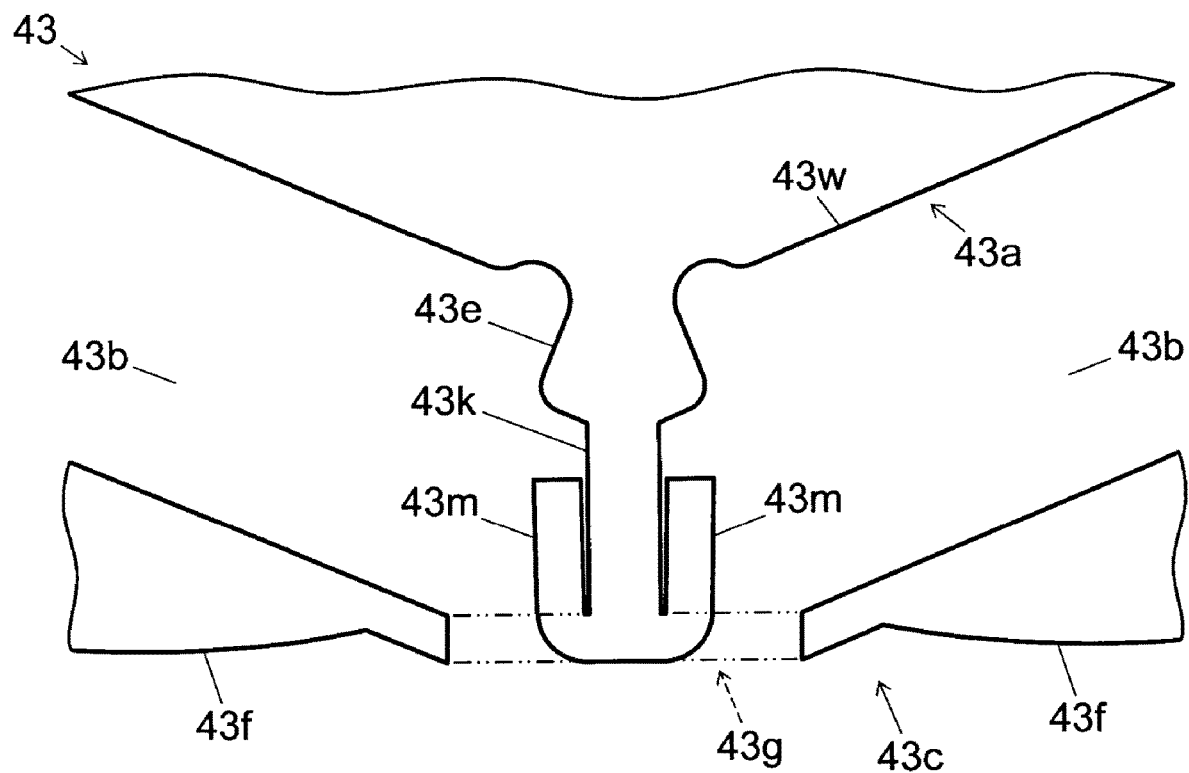
FIG. 9 is a partial enlarged plan view of a connected laminate steel plate of a rotor core according to a third example embodiment of the present disclosure.

Next, a motor according to a third preferred embodiment of the present invention will be described. FIG. 9 is a partial enlarged plan view of a connected laminate steel plate of a rotor core according to a third preferred embodiment of the present invention. Also, since a basic configuration of this preferred embodiment is the same as that of the first and second preferred embodiments described above, constituent elements common to those preferred embodiments are denoted by the same reference numerals or the same names as before and the explanation thereof may be omitted.

The rotor core 40 of the third preferred embodiment has a configuration in which, in the small diameter portion 43g of the connected laminate steel plate 43 shown in FIG. 9, two coupling portions 43m circumferentially adjacent to one connecting portion 43k are cut from the large diameter portion 43f. The coupling portions 43m are cut inward from a radially outer side of the connected laminate steel plate 43 with respect to the connected laminate steel plates 43 which are laminated. Therefore, the rotor core 40 of the third preferred embodiment has a structure in which laminate steel plates obtained by cutting the coupling portions 43m of the connected laminate steel plate 43 are laminated in the axial direction.

The coupling portion 43m is cut at a position close to the large diameter portion 43f. The coupling portion 43m is bent inward in the radial direction. The bent coupling portion 43m is adjacent to the penetrating portion 43b side of the connecting portion 43k.

Figure 10:
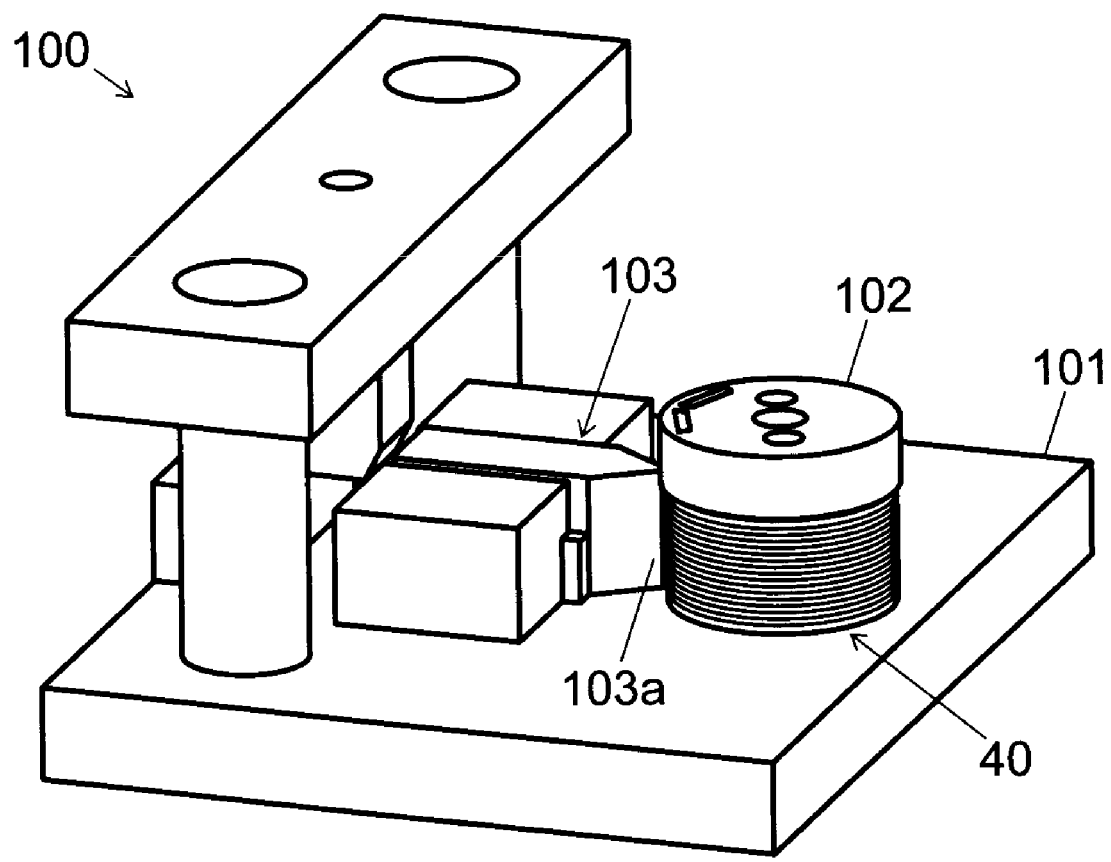
FIG. 10 is a perspective view showing an example of a cutting device used in a manufacturing method of the rotor core according to the third example embodiment of the present disclosure.
Figure 11:
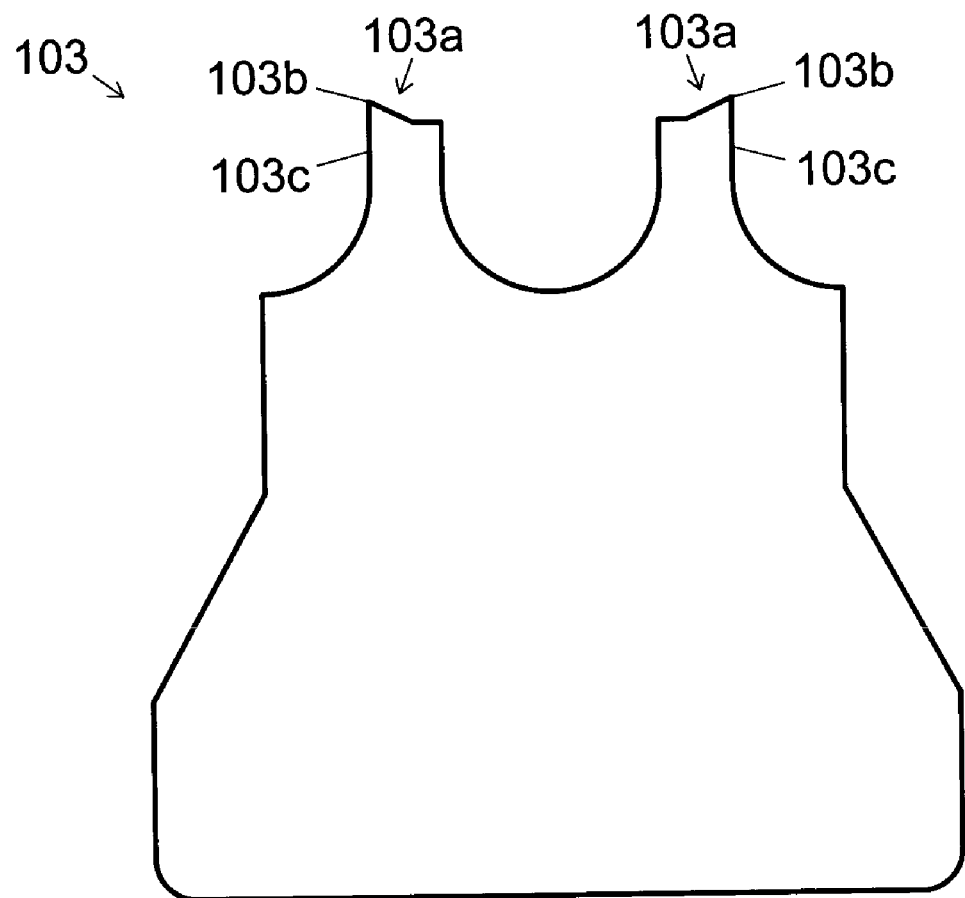
FIG. 11 is a partially enlarged plan view showing an example of a cutting tool used in the manufacturing method of the rotor core according to the third example embodiment of the present disclosure.

Next, a manufacturing method of the rotor core 40, which is a motor core, will be described with reference to FIGS. 10 and 11. FIG. 10 is a perspective view showing an example of a cutting device used in the manufacturing method of the rotor core according to the third preferred embodiment of the present invention. FIG. 11 is a partial enlarged plan view showing an example of a cutting tool used in the manufacturing method of the rotor core according to the third preferred embodiment of the present invention.

The manufacturing method of the rotor core 40 of the third preferred embodiment includes a process of laminating the connected laminate steel plates 43 in the axial direction. In this process, the connected laminate steel plates 43 are laminated from the upper end to the lower end in the axial direction. In this way, the rotor core 40 of the third preferred embodiment is formed only by the laminate steel plates in which the coupling portions 43m of the connected laminate steel plate 43 is cut. Also, in the process including the connected laminate steel plates 43, the first laminate steel plates 41, the second laminate steel plates 42, and the like may be laminated in combination.

Next, the manufacturing method of the rotor core 40 of the third preferred embodiment includes a process of cutting the coupling portions 43m. In this process, for example, a cutting device 100 shown in FIG. 10 is used.

The cutting device 100 includes a pedestal portion 101, a pressing member 102, and a cutting tool 103. The rotor core 40 is placed on an upper surface of the pedestal portion 101 with the axial direction being substantially vertical. A pressing member 102 is disposed above the rotor core 40. The pressing member 102 holds the rotor core 40 between itself and the upper surface of the pedestal portion 101.

The cutting tool 103 is disposed on a radially outer side of the rotor core 40 disposed on the upper surface of the pedestal portion 101. The cutting tool 103 can move in the radial direction of the rotor core 40. The cutting tool 103 can press and abut its tip portion facing the outer circumferential surface of the rotor core 40 against the outer circumferential surface of the rotor core 40.

The cutting tool 103 has blade portions 103a shown in FIG. 11 at a tip portion opposed to the outer circumferential surface of the rotor core 40. The blade portions 103a extend in the axial direction of the rotor core 40.

The blade portions 103a are provided at two locations separated in the circumferential direction. Each of the two blade portions 103a has a corner portion 103b and a flat portion 103c on an outer surface on its circumferentially outer side. The two blade portions 103a cut the two coupling portions 43*m* from the large diameter portion 43*f* by using the corner portion 103*b* and the flat portion 103*c*, respectively.

Since the manufacturing method of the rotor core 40 of the third preferred embodiment includes the process of cutting the coupling portions 43*m* of the connected laminate steel plate 43, it is possible to eliminate the state in which the large diameter portions 43*f* of the connected annular portions 43*c* adjacent to each other in the circumferential direction are connected in the circumferential direction via the small diameter portions 43*g*. Thus, the leakage of the magnetic flux that may occur at the coupling portion 43*m* before cutting can be suppressed. Therefore, it is possible to suppress occurrence of a magnetic loop in the rotor core 40.

In the process of cutting the coupling portion 43*m*, the connected laminate steel plate 43 is cut from the outer side to the inner side in the radial direction. According to this configuration, the coupling portion 43*m* of the connected annular portion 43*c* can be cut using the cutting device 100 without requiring a high-power pressing device. Therefore, it is possible to suppress the increase in size and cost of a manufacturing device of the rotor core 40.

In the conventional manufacturing method of punching a laminate steel plate in the axial direction, an additional process such as a half-punching process or the like is necessary in advance. On the other hand, the manufacturing method according to the modification of the rotor core 40 of the second preferred embodiment can be formed into a desired shape without requiring an additional process.

Further, in the conventional manufacturing method of punching a laminate steel plate in the axial direction, there is a possibility that sags or burrs may occur in the laminate steel plated at a lower end in the axial direction of the rotor core. On the other hand, in the manufacturing method according to the modification of the rotor core 40 of the second preferred embodiment, the cutting is performed from the radially outer side. Thus, the cutting distance required for the cutting becomes short in the laminate steel plate at a lower end of the rotor core 40 in the axial direction, so that occurrence of sags and burrs can be prevented.

Next, the manufacturing method of the rotor core 40 of the third preferred embodiment may include a process of removing the connecting portion 43*k*. With this, occurrence of magnetic saturation that may occur at the connecting portion 43*k* before removal can be suppressed. Therefore, it is possible to effectively suppress occurrence of a magnetic loop in the rotor core 40.

The configuration of the cutting device 100 described with reference to FIGS. 10 and 11 is an example, and other configurations may be adopted as long as the connected laminate steel plate 43 can be cut from the outer side to the inner side in the radial direction.

Figure 12:
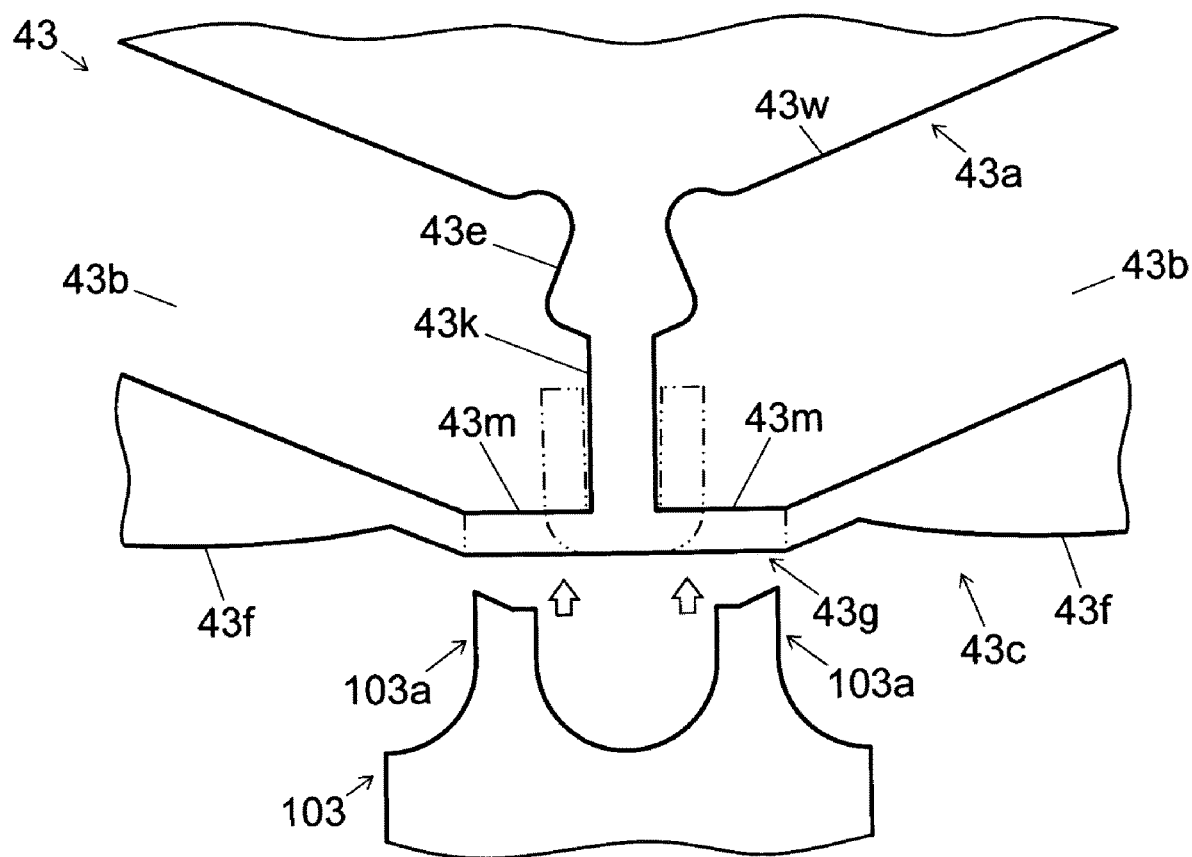
FIG. 12 is a partial enlarged plan view of a connected laminate steel plate showing a first example of a cutting process in the manufacturing method of the rotor core according to the third example embodiment of the present disclosure.

Next, a first example of the cutting process in the manufacturing method of the rotor core 40 will be described with reference to FIG. 12. FIG. 12 is a partial enlarged plan view of the connected laminate steel plate showing the first example of the cutting process in the manufacturing method of the rotor core according to the third preferred embodiment of the present invention.

In the manufacturing method of the rotor core 40 of the third preferred embodiment, the first example of the process of cutting the coupling portion 43*m* uses the cutting tool 103 shown in FIG. 11. In this cutting process shown in FIG. 12, coupling portions 43*m* at two locations circumferentially adjacent to one connecting portion 43*k* are simultaneously cut. As shown in FIG. 9, the coupling portions 43*m* cut at the two locations are bent inward in the radial direction.

First, two coupling portions 43*m* are simultaneously cut and bent. Next, the rotor core 40 is rotated around the central axis by the angle between the connecting portions 43*k* adjacent to each other in the circumferential direction. Subsequently, two coupling portions 43*m* circumferentially adjacent to the next one connecting portion 43*k* are simultaneously cut and bent. Subsequently, the cutting and bending of two coupling portions 43*m* and the rotation of the rotor core 40 are repeated over the entire outer edge portion of the rotor core 40.

According to this method, since the two coupling portions 43*m* are simultaneously cut, it is possible to minimize deformation of the rotor core 40, in particular, deformation of the connecting portion 43*k* which may occur at the time of cutting. Further, at the time of cutting, it is possible to cut while holding one connecting portion 43*k* disposed between two adjacent coupling portions 43*m*. Thus, the efficiency of the cutting operation can be improved.

Figure 13:
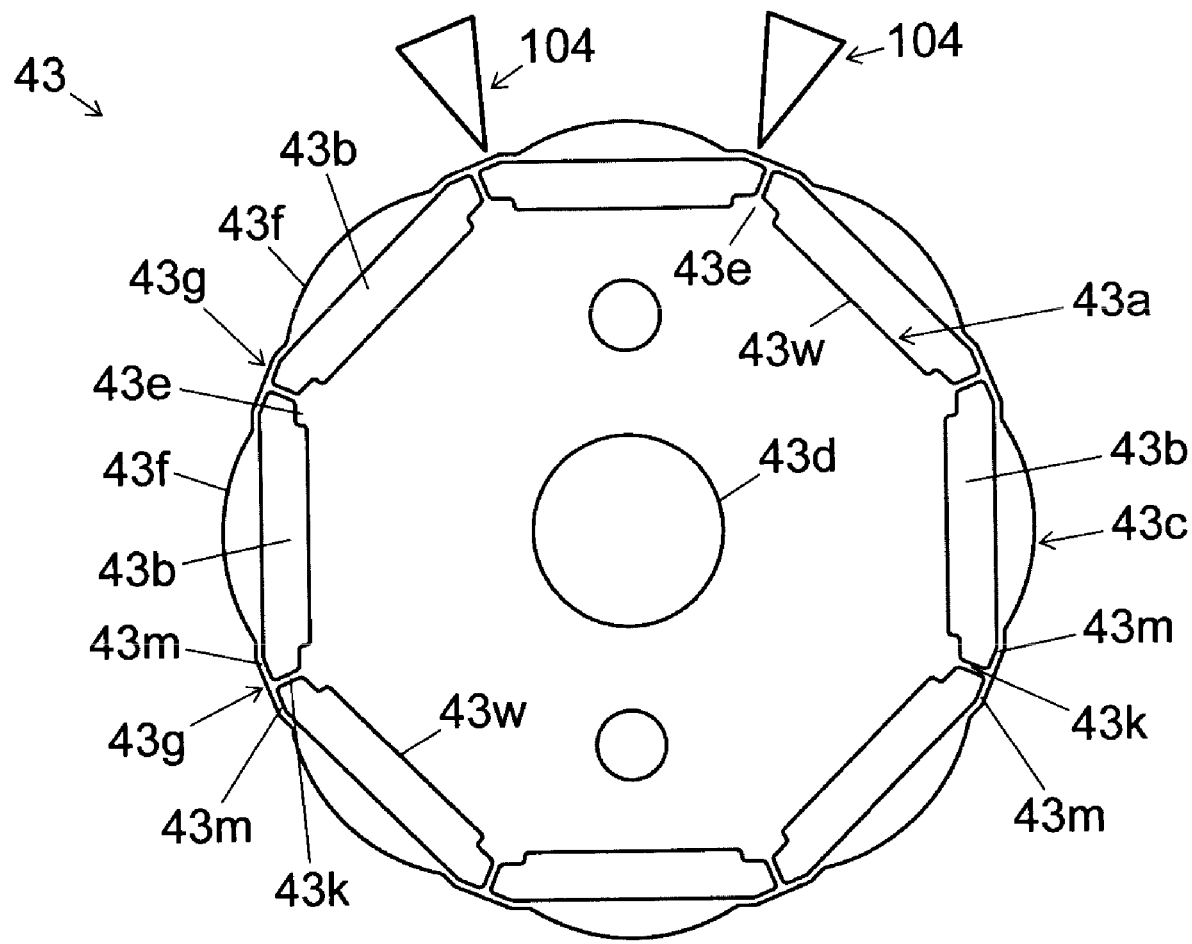
FIG. 13 is a plan view of a connected laminate steel plate showing a second example of the cutting process in the manufacturing method of the rotor core according to the third example embodiment of the present disclosure.

Next, a second example of the cutting process in the manufacturing method of the rotor core 40 will be described with reference to FIG. 13. FIG. 13 is a plan view of the connected laminate steel plate showing the second example of the cutting process of the manufacturing method of the rotor core 40 according to the third preferred embodiment of the present invention.

In the manufacturing method of the rotor core 40 of the third preferred embodiment, a cutting tool 104 having only one blade portion 103*a* is used (see FIG. 13). In this cutting process shown in FIG. 13, coupling portions 43*m* of a connected annular portion 43*c* located at two locations on circumferentially inner sides with respect to two connecting portions 43*k* adjacent to each other in the circumferential direction are simultaneously cut. The cut coupling portions 43*m* at the two locations are bent, for example, radially inward.

First, two coupling portions 43*m* are simultaneously cut and bent. Next, the rotor core 40 is rotated around the central axis by the angle between connecting portions 43*k* adjacent to each other in the circumferential direction. Subsequently, two coupling portions 43*m* located on the circumferentially inner sides with respect to the next two connecting portions 43*k* adjacent to each other in the circumferential direction are cut and bent at the same time. Subsequently, the cutting and bending of two coupling portions 43*m* and the rotation of the rotor core 40 are repeated over the entire outer edge portion of the rotor core 40.

According to this method, since the two coupling portions 43*m* are simultaneously cut, it is possible to minimize deformation of the rotor core 40, in particular, deformation of the connecting portion 43*k* which may occur at the time of cutting. In addition, it is possible to equalize the shape and size of the large diameter portion 43*f* of the connected annular portion 43*c*, which is a region between the two connecting portions 43*k* adjacent to each other in the circumferential direction.

Figure 14:
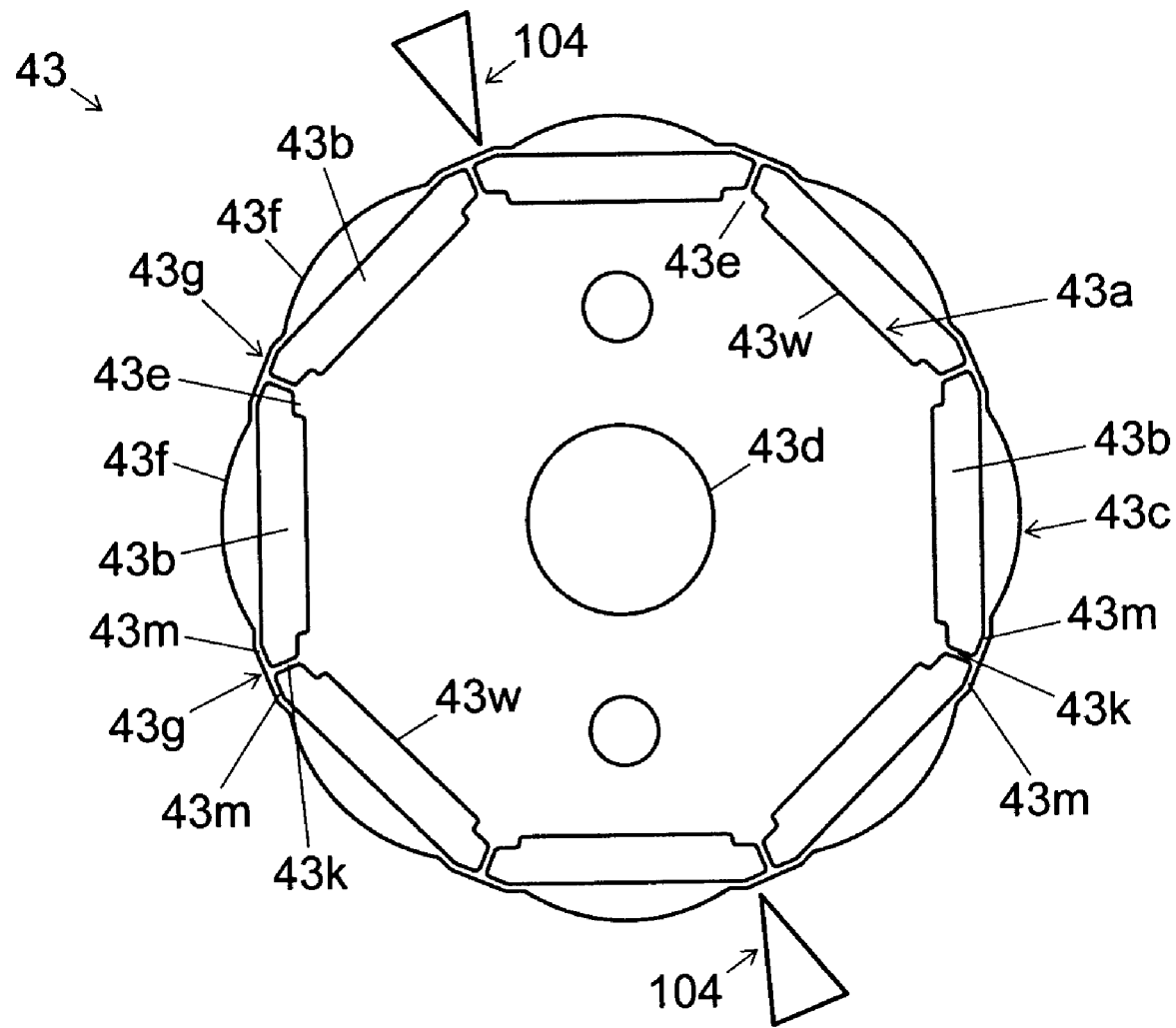
FIG. 14 is a plan view of a connected laminate steel plate showing a third example of the cutting process in the manufacturing method of the rotor core according to the third example embodiment of the present disclosure.

Next, a third example of the cutting process in the manufacturing method of the rotor core 40 will be described with reference to FIG. 14. FIG. 14 is a plan view of a connected laminate steel plate showing a third example of the cutting process in the manufacturing method of the rotor core according to the third preferred embodiment of the present invention.

In the manufacturing method of the rotor core 40 of the third preferred embodiment, a cutting tool 104 having only one blade portion 103*a* is used (see FIG. 14). In this cutting process shown in FIG. 14, coupling portions 43*m* disposed at two locations on sides opposite to each other with the central axis located therebetween are simultaneously cut. The coupling portions 43m at the two locations are bent, for example, radially inward.

First, two coupling portions 43m are simultaneously cut and bent. Next, the rotor core 40 is rotated around the central axis by the angle between the connecting portions 43k adjacent to each other in the circumferential direction. Subsequently, the next two coupling portions 43m disposed on sides opposite to each other with the central axis located therebetween are simultaneously cut and bent. Subsequently, the cutting and bending of two coupling portions 43m and the rotation of the rotor core 40 are repeated over the entire outer edge portion of the rotor core 40.

According to this method, since two coupling portions 43m are simultaneously cut, it is possible to minimize deformation of the rotor core 40, in particular, deformation of the connecting portion 43k which may occur at the time of cutting.

The cutting process used in the third preferred embodiment is not limited to the rotor core as long as it is a motor core, and it may be adopted for a stator core. For example, a process of cutting toward a slot provided in a stator core may be considered.

Figure 15:
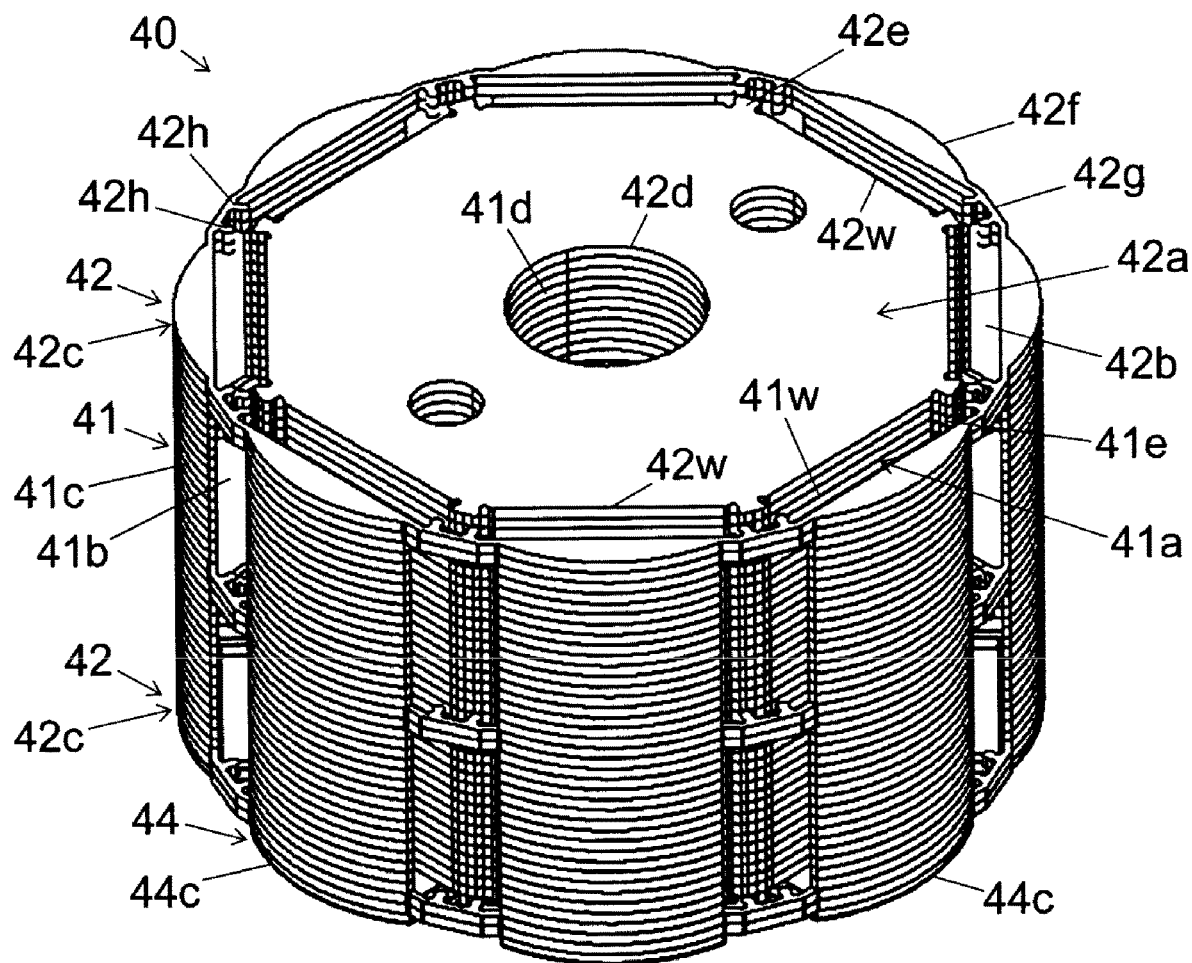
FIG. 15 is a perspective view of a rotor core of a motor according to a fourth example embodiment of the present disclosure viewed from above.
Figure 16:
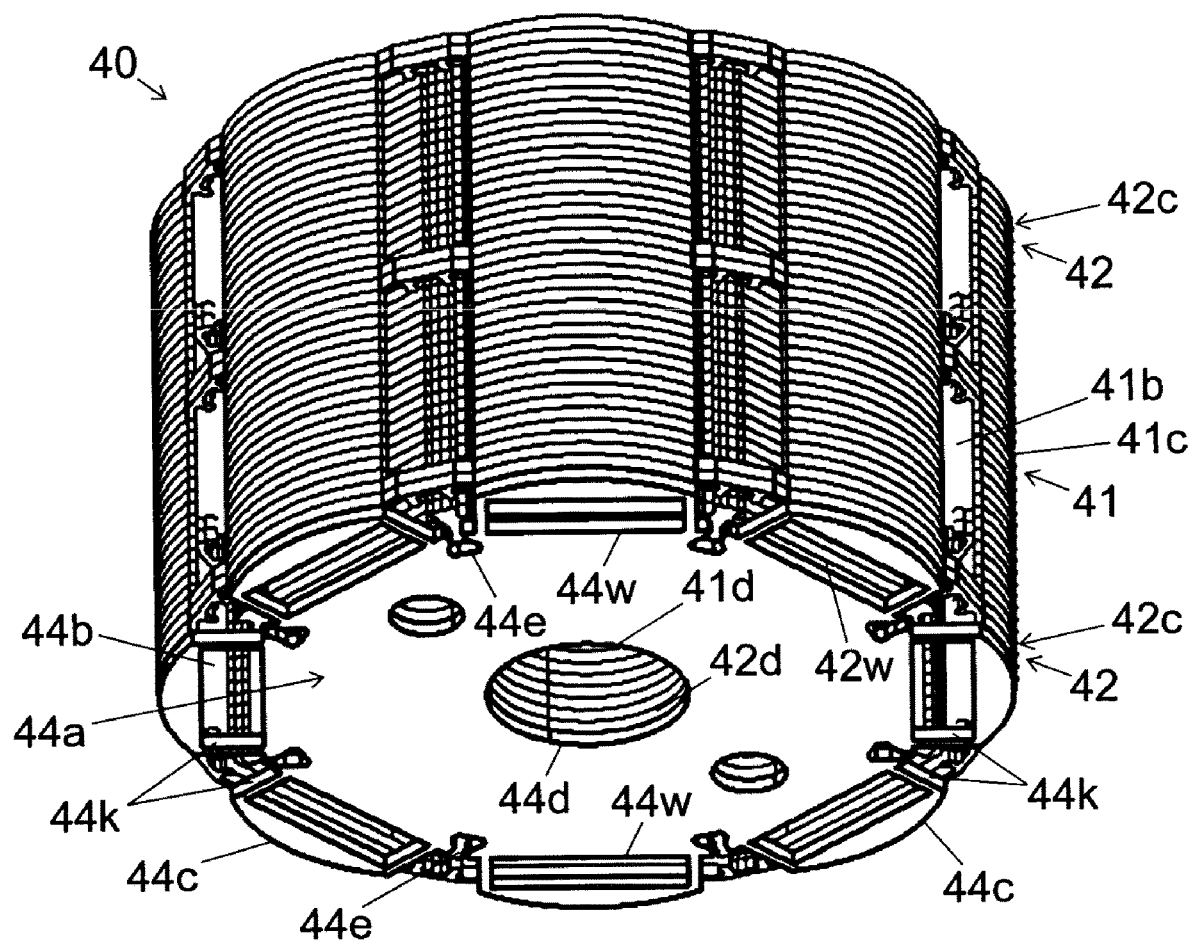
FIG. 16 is a perspective view of the rotor core of the motor according to the fourth example embodiment of the present disclosure as viewed from the below.
Figure 17:
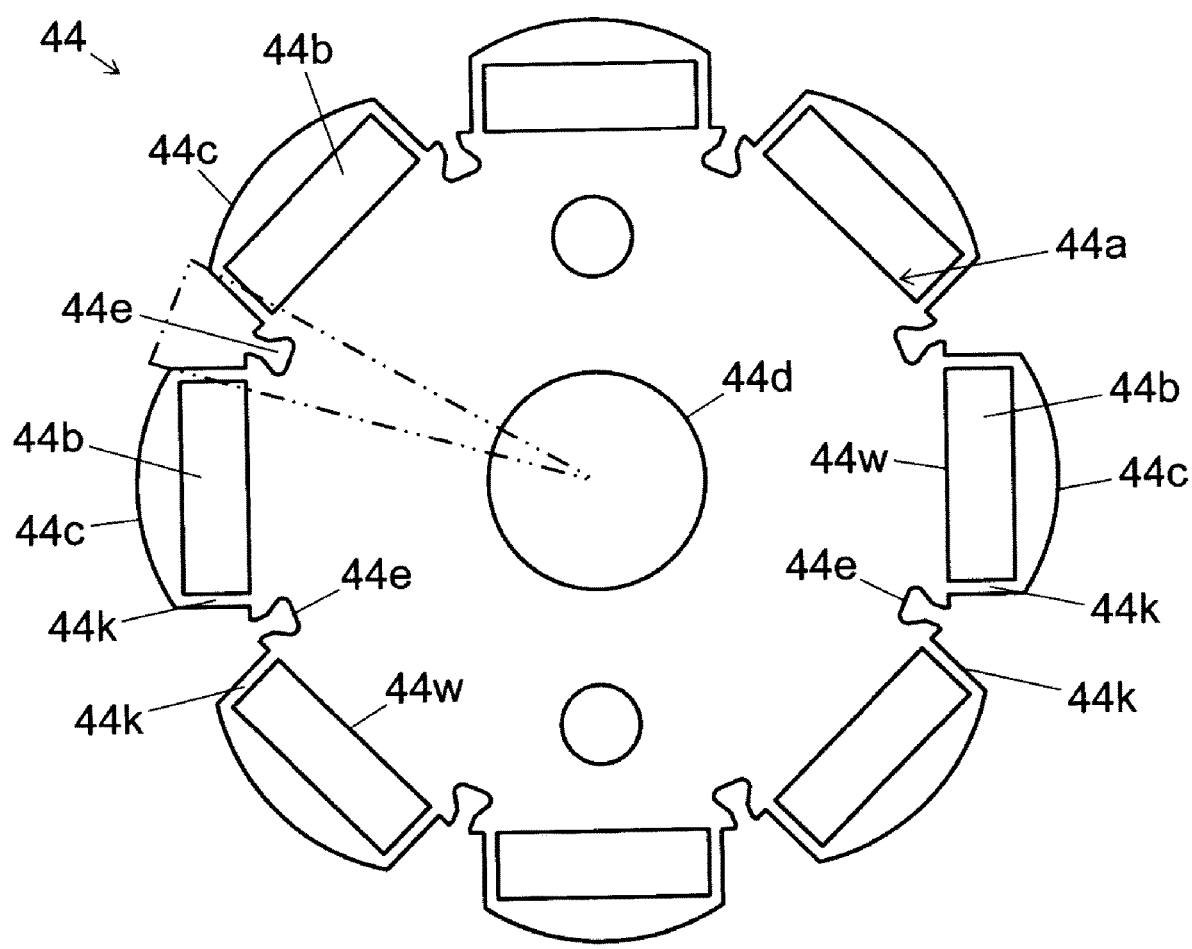
FIG. 17 is a plan view of a connected laminate steel plate of the rotor core according to the fourth example embodiment of the present disclosure.

Next, a motor according to a fourth preferred embodiment of the present invention will be described. FIG. 15 is a perspective view of a rotor core of the motor according to the fourth preferred embodiment of the present invention as viewed from above. FIG. 16 is a perspective view of the rotor core of the motor according to the fourth preferred embodiment of the present invention as viewed from below. FIG. 17 is a plan view of a connected laminate steel plate of the rotor core according to the fourth embodiment of the present invention. Since a basic configuration of this preferred embodiment is the same as that of the first and second preferred embodiments described above, constituent elements common to those preferred embodiments are denoted by the same reference numerals or same names as before, and explanation thereof may be omitted.

The rotor core 40 shown in FIGS. 15 and 16 has a connected laminate steel plate 44 in addition to the first laminate steel plates 41 and the second laminate steel plates 42. Similarly to the first laminate steel plate 41 and the second laminate steel plate 42, the connected laminate steel plate 44 expands in the radial direction with respect to the central axis of the rotor core 40.

The connected laminate steel plate 44 shown in FIG. 17 has a connected base portion 44a, penetrating portions 44b, connected piece portions 44c, and connecting portion 44k.

The connected base portion 44a has recessed portions 44e. The recessed portions 44e are provided in angular regions with respect to the central axis between the connected piece portions 44c adjacent to each other in the circumferential direction. That is, the recessed portions 44e are provided in fan-shaped regions surrounded by circumferentially opposed end portions of circumferentially adjacent connected piece portions 44c and the central axis, respectively. In other words, the recessed portions 44e are provided in the column portions 33a of the rotor 3. An example of the fan-shaped angular region with respect to the center axis between the circumferentially adjacent connected piece portions 44c is illustrated with a one-dot chain line in FIG. 17.

The recessed portion 44e is recessed radially inward from an outer edge portion 44w of the connected base portion 44a. When the connected base portion 44a is polygonal, the recessed portion 44e is recessed radially inward from each apex of the connected base portion 44a. Since the connected base portion 44a has the recessed portions 44e, when a synthetic resin, adhesive or the like is poured on radially outer sides of the first base portion 41a, the second base portion 42a and the connected base portion 44a after inserting the magnets 32 into the penetrating portions 41b and 42b, the synthetic resin, adhesive, etc. enter the recessed portions 44e. Thus, it is possible to firmly fix the connected piece portions 44c and the magnets 32.

The penetrating portion 44b is formed as a gap between the connected base portion 44a and the connected piece portion 44c. Connecting portions 44k are provided on both circumferential sides of the penetrating portion 44b. The connecting portion 44k overlaps the penetrating portion 41b of the first laminate steel plate 41 and the penetrating portion 42b of the second laminate steel plate 42. As a result, the magnet 32 inserted into the penetrating portion 41b and the penetrating portion 42b is caught by the connecting portion 44k. Therefore, it is possible to prevent the magnet 32 from downwardly falling off the rotor core 40.

The connected piece portion 44c is separately disposed on a radially outer side of the connected base portion 44a with the penetrating portion 44b therebetween. The separation mentioned here includes a form in which the connected piece portion 44c and the connected base portion 44a are partially connected by the connecting portion 44k. For example, eight connected piece portions 44c are disposed at predetermined intervals in the circumferential direction. The center of the connected piece portion 44c is shifted radially outward from the axis of the shaft 31 in its shape in a plan view, and the connected piece portion 44c is in a semicircular or substantially semicircular shape which has an arc having a radius smaller than the radius of the rotor 3 and a straight portion corresponding to a string positioned on the radially inner side of the arc. The straight portion on the radially inner side of the connecting piece portion 44c is substantially parallel to the outer edge portion 44w of the connected base portion 44a.

The connecting portions 44k are disposed in regions between the connected base portion 44a and the connected piece portions 44c in the radial direction. The connecting portions 44k are provided on circumferential end portions of the connected piece portion 44c with respect to one connected piece portion 44c, respectively, and extend in parallel to each other. The connecting portions 44k have an elongated plate or substantially elongated plate shape extending in a substantially radial direction in their shape in a plan view. The connecting portions 44k connect the connected base portion 44a and the connected piece portions 44c. More specifically, the connecting portions 44k connect both circumferential side regions of the recessed portion 44e and straight portions of the connecting piece portions 44c at both circumferential ends.

In the rotor core 40 shown in FIGS. 15 and 16, for example, two second laminate steel plates 42 are disposed at the upper end and a lower portion in the axial direction, and a plurality of first laminate steel plates 41 are disposed between the second laminate steel plate 42 at the upper end in the axial direction and the second laminate steel plate 42 at the lower portion in the axial direction. For example, two second laminate steel plates 42 are disposed also in a middle portion of the plurality of first laminate steel plates 41 laminated in the axial direction. Further, for example, one connected laminate steel plate 44 is disposed at the lower end in the axial direction. At this time, the piece portion 41c of the first laminate steel plate 41, the large diameter portion 42f of the annular portion 42c of the second laminate steel plate 42, and the connected piece portion 44c of the connected laminate steel plate 44 overlap in the axial direction, and the first laminate steel plate 41, the second laminate steel plate 42 and the connected laminate steel plate 44 are laminated at a position where their outer peripheral edges are partially aligned.

According to this configuration, it is possible to further improve the strength of the rotor core 40. In addition, when the magnet 32 is inserted into the penetrating portions 41b and 42b, the magnet 32 is caught by the connecting portions 44k in the axial direction. This makes it possible to prevent the magnet 32 from falling off the rotor core 40. Furthermore, it is possible to prevent the first base portion 41a and the piece portions 41c from being separated from each other, and the second base portion 42a and the annular portions 42c from being separated.

The connected laminate steel plate 44 may be disposed at the upper end in the axial direction of the rotor core 40. Also, the connected laminate steel plates 44 may be disposed at both the lower end and the upper end in the axial direction of the rotor core 40. According to this configuration, it is possible to further increase the strength of the rotor core 40. Further, the upper connected laminate steel plate 44 and the lower connected laminate steel plate 44 may have different shapes. For example, the upper end may be a connected laminate steel plate 44 having penetrating portions through which the magnets 32 are inserted, and the lower end may be a connected laminate steel plate 44 for preventing the magnets 32 from falling off.

In the rotor core 40, the first laminate steel plate 41 has the protruding portion 41e, the second laminate steel plate 42 has the protruding portion 42e, and the connected laminate steel plate 44 has the recessed portion 44e. The magnet 32 can be brought into contact with the protruding portions 41e and 42e when the magnet 32 is inserted into the penetrating portions 41b and 42b. Accordingly, the positioning of the magnet 32 can be performed in the circumferential direction. Further, when a synthetic resin, an adhesive or the like is poured on a radially outer side of the first base portion 41a or the like after inserting the magnet 32 into the penetrating portions 41b and 42b, the synthetic resin, adhesive or the like intrudes into the recessed portions 44e. Thus, the magnet 32 can be firmly fixed. Therefore, it is possible to realize both positioning of the magnet 32 and firm fixation of the magnet 32.

Figure 18:
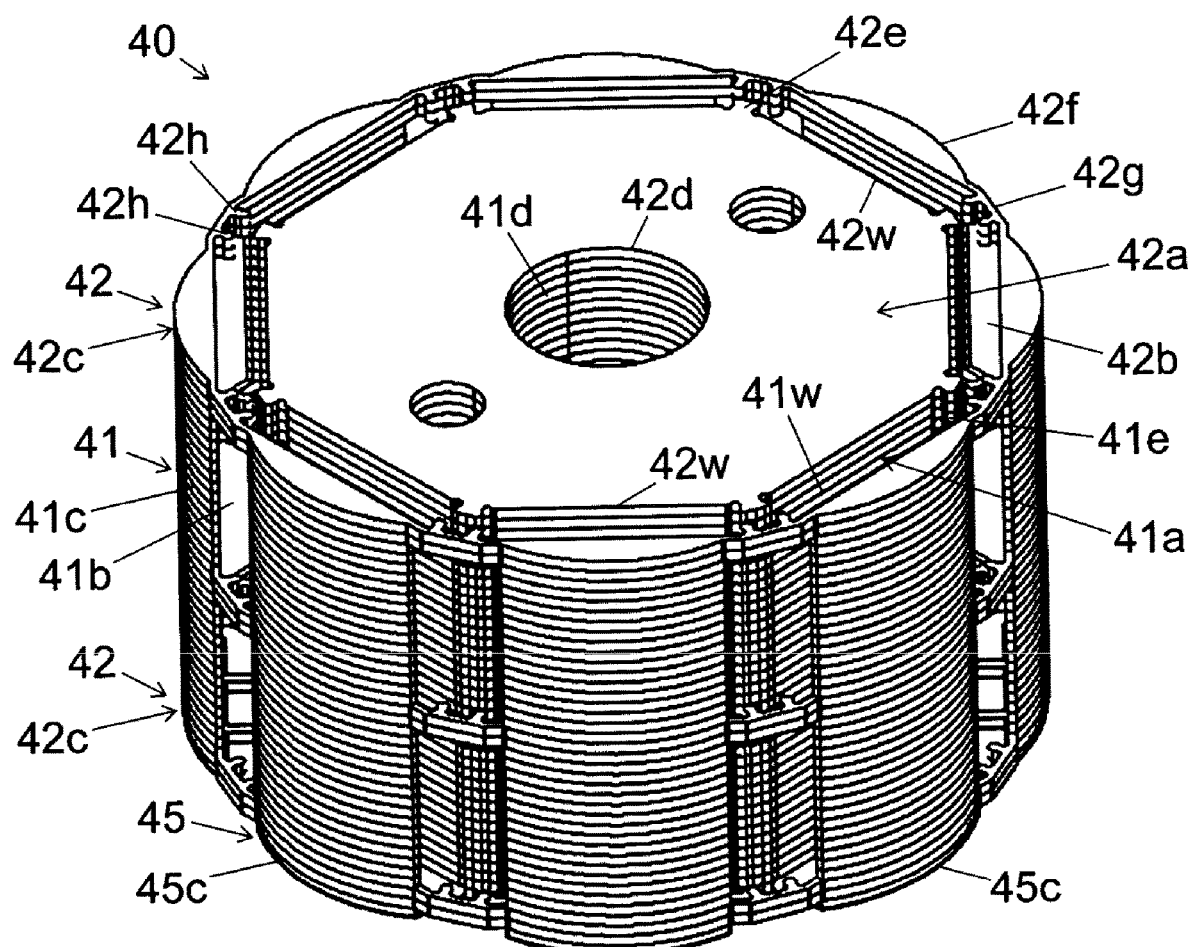
FIG. 18 is a perspective view of a rotor core of a motor according to a fifth example embodiment of the present disclosure as viewed from above.
Figure 19:
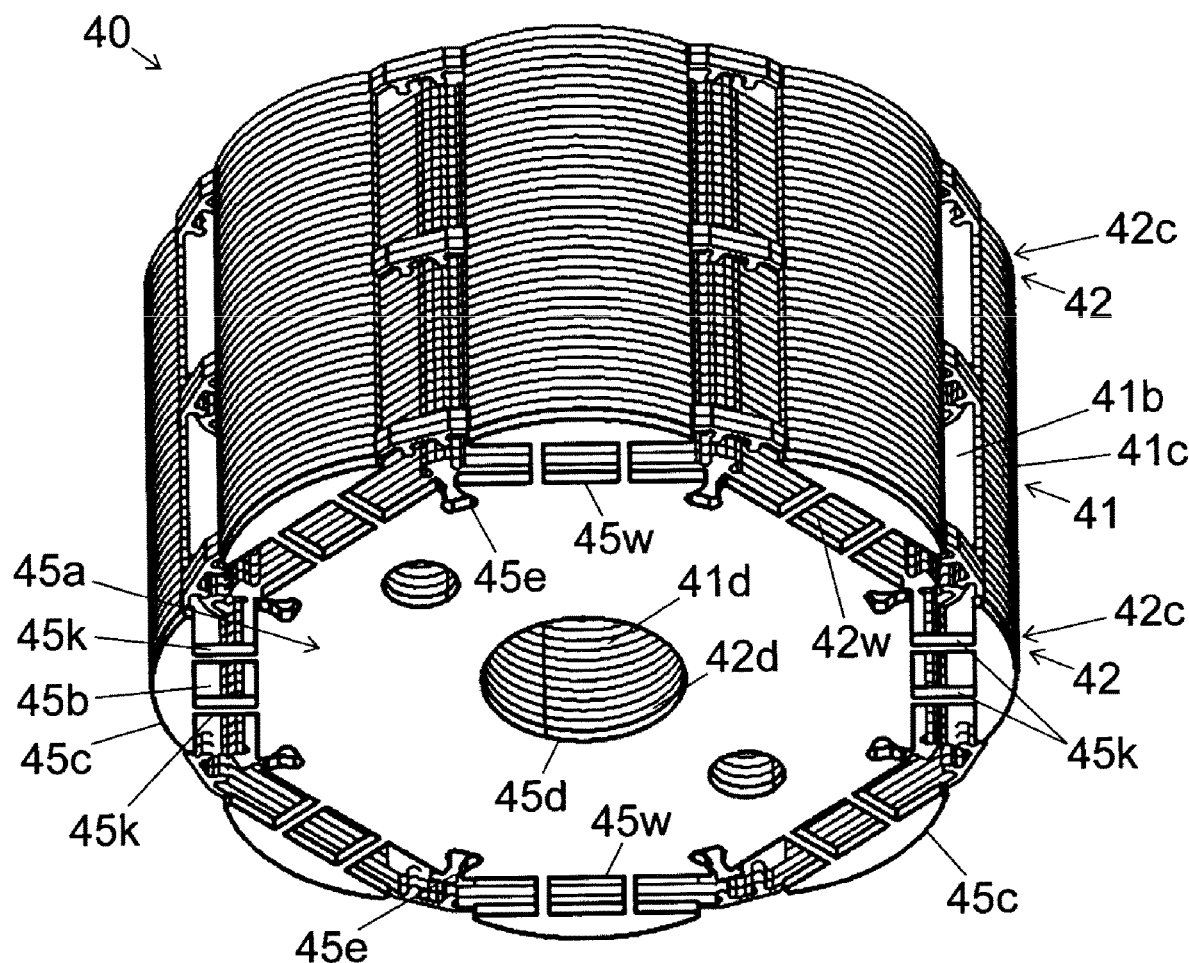
FIG. 19 is a perspective view of the rotor core of the motor according to the fifth example embodiment of the present disclosure as viewed from below.
Figure 20:
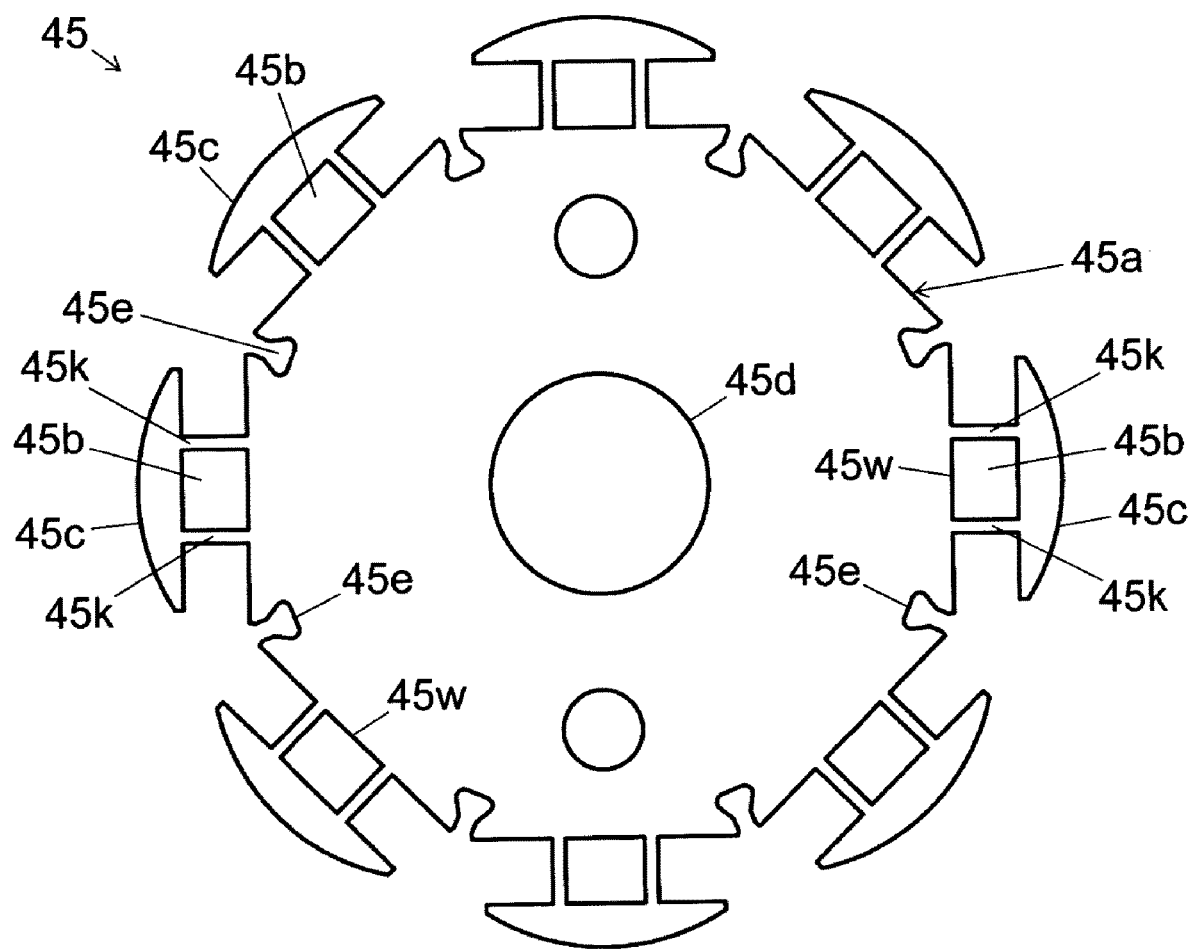
FIG. 20 is a plan view of a connected laminate steel plate of the rotor core according to the fifth example embodiment of the present disclosure.

Next, a motor according to a fifth preferred embodiment of the present invention will be described. FIG. 18 is a perspective view of a rotor core of the motor according to the fifth preferred embodiment of the present invention as viewed from above. FIG. 19 is a perspective view of the rotor core of the motor according to the fifth preferred embodiment of the present invention as viewed from below. FIG. 20 is a plan view of a connected laminate steel plate of the rotor core according to the fifth preferred embodiment of the present invention. Since a basic configuration of this preferred embodiment is the same as the first, second and third preferred embodiments described above, constituent elements common to those preferred embodiments are denoted by the same reference numerals or same names as before, and explanation thereof may be omitted.

The rotor core 40 shown in FIGS. 18 and 19 has a connected laminate steel plate 45 in addition to the first laminate steel plate 41 and the second laminate steel plate 42. Similarly to the first laminate steel plate 41 and the second laminate steel plate 42, the connected laminate steel plate 45 expands in the radial direction with respect to the central axis of the rotor core 40.

The connected laminate steel plate 45 shown in FIG. 20 has a connected base portion 45a, penetrating portions 45b, connected piece portions 45c, and connecting portions 45k.

The connected base portion 45a, the penetrating portion 45b, and the connected piece portion 45c have the same configuration as the connected base portion 44a, the penetrating portion 44b and the connecting piece portion 44c of the connected laminate steel plate 44 of the fourth preferred embodiment. That is, the connected base portion 45a has a hole portion 45d and recessed portions 45e.

The penetrating portion 45b is configured as a gap between the connected base portion 45a and the connected piece portion 45c. The connecting portions 45k are provided on both circumferential sides of the penetrating portion 45b. The connecting portions 45k overlap the penetrating portion 41b of the first laminate steel plate 41 and the penetrating portion 42b of the second laminate steel plate 42. As a result, the magnet 32 inserted into the penetrating portion 41b and the penetrating portion 42b is caught by the connecting portions 45k. Therefore, it is possible to prevent the magnet 32 from downwardly falling off the rotor core 40.

The connected piece portion 45c is separately disposed on a radially outer side of the connected base portion 45a with the penetrating portion 45b therebetween. The separation mentioned here includes a form in which the connected piece portion 45c and the connected base portion 45a are partially connected by the connecting portion 45k. For example, eight connected piece portions 45c are disposed at predetermined intervals in the circumferential direction. The center of the connected piece portion 45c is shifted radially outward from the axis of the shaft 31 in its shape in a plan view, and the connected piece portion 45c is in a semicircular or substantially semicircular shape which has an arc having a radius smaller than the radius of the rotor 3 and a straight portion corresponding to a string positioned on the radially inner side of the arc. The straight portion on the radially inner side of the connecting piece portion 45c is substantially parallel to an outer edge portion 45w of the connected base portion 45a.

The connecting portions 45k are disposed in regions between the connected base portion 45a and the connected piece portions 45c in the radial direction. The connecting portions 45k are provided at two locations inward from circumferential end portions of the connected piece portion 45c with respect to one straight portion of the connected piece portion 45c, and extend in parallel to each other. The connecting portions 45k connect the outer edge portion 45w of the connected base portion 45a and the straight portion of the connected piece portion 45c. The connecting portions 45k have an elongated plate or substantially elongated plate shape extending in a substantially radial direction in their shape in a plan view.

In the rotor core 40 shown in FIGS. 18 and 19, for example, two second laminate steel plates 42 are disposed at the upper end and a lower portion in the axial direction, and a plurality of first laminate steel plates 41 are disposed between the second laminate steel plate 42 at the upper end in the axial direction and the second laminate steel plate 42 at the lower portion in the axial direction. For example, two second laminate steel plates 42 are disposed also in a middle portion of the plurality of first laminate steel plates 41 laminated in the axial direction. Further, for example, one connected laminate steel plate 45 is disposed at the lower end in the axial direction. At this time, the piece portion 41c of the first laminate steel plate 41, the large diameter portion 42f of the annular portion 42c of the second laminate steel plate 42, and the connected piece portion 45c of the connected laminate steel plate 45 overlap in the axial direction, and the first laminate steel plate 41, the second laminate steel plate 42 and the connected laminate steel plate 45 are laminated at a position where their outer edge portions are partially aligned.

According to this configuration, it is possible to further improve the strength of the rotor core 40. Further, when the magnet 32 is inserted into the penetrating portions 41b and 42b, the magnet 32 is caught by the connecting portions 45k in the axial direction. This makes it possible to prevent the magnet 32 from falling off the rotor core 40. Furthermore, it is possible to prevent the first base portion 41a and the piece portion 41c from being separated from each other, and the second base portion 42a and the annular portion 42c from being separated.

In addition, the connected laminate steel plate 45 may be disposed at the upper end in the axial direction of the rotor core 40. Also, the connected laminate steel plates 45 may be disposed at both the lower end and the upper end in the axial direction of the rotor core 40. According to this configuration, it is possible to further increase the strength of the rotor core 40. Further, the connected laminate steel plate 45 at the upper end and the connected laminate steel plate 45 at the lower end may have different shapes. For example, the upper end may be a connected laminate steel plate 45 having penetrating portions through which the magnets 32 are inserted, and the lower end may be a connected laminate steel plate 45 for preventing the magnets 32 from falling off.

Also, in the rotor core 40, the first laminate steel plate 41 has the protruding portion 41e, the second laminate steel plate 42 has the protruding portion 42e, and the connected laminate steel plate 45 has the recessed portion 45e. The magnet 32 can be brought into contact with the protruding portions 41e and 42e when the magnet 32 is inserted into the penetrating portions 41b and 42b. Accordingly, the positioning of the magnet 32 can be performed in the circumferential direction. Further, when a synthetic resin, an adhesive or the like is poured on a radially outer side of the first base portion 41a or the like after inserting the magnet 32 into the penetrating portions 41b and 42b, the synthetic resin, adhesive or the like intrudes into the recessed portions 45e. Thus, the magnet 32 can be firmly fixed. Therefore, it is possible to realize both positioning of the magnet 32 and firm fixation of the magnet 32.

Figure 21:
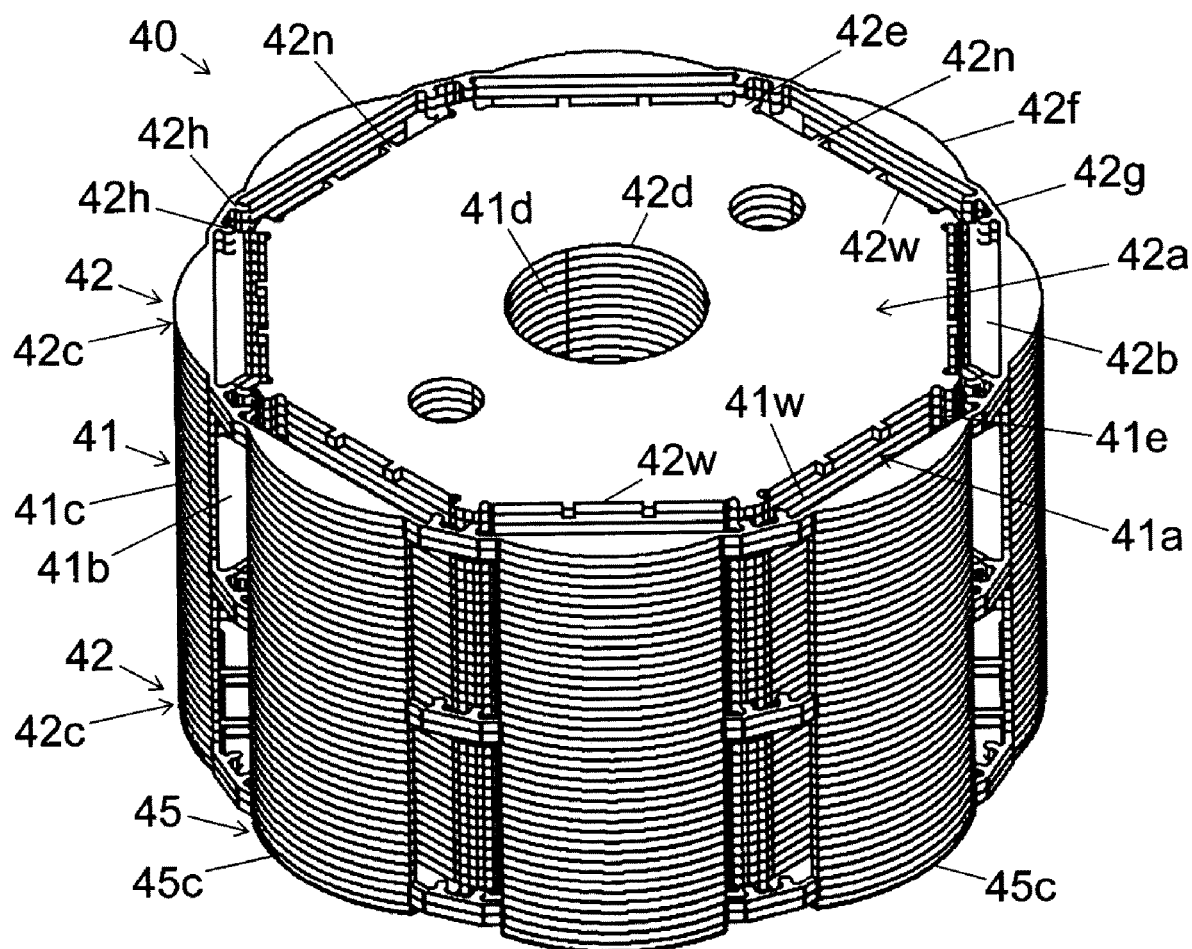
FIG. 21 is a perspective view of a first modification of the rotor core according to the fifth example embodiment of the present disclosure as seen from above.
Figure 22:
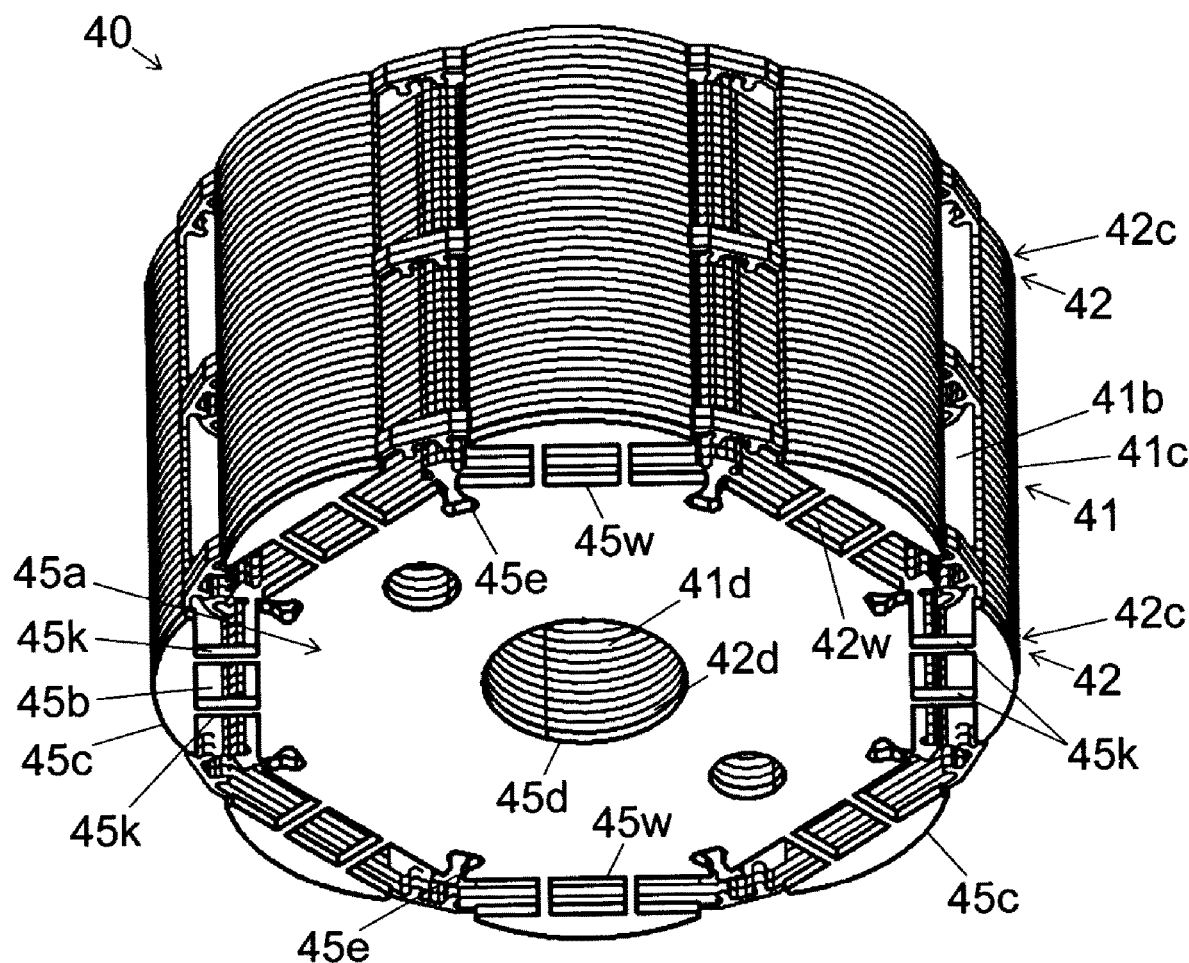
FIG. 22 is a perspective view of the first modification of the rotor core according to the fifth example embodiment of the present disclosure as seen from the below.

Subsequently, a first modification of the rotor core 40 of the fifth preferred embodiment will be described. FIG. 21 is a perspective view of the first modification of the rotor core according to the fifth preferred embodiment of the present invention as seen from above. FIG. 22 is a perspective view of the first modification of the rotor core according to the fifth preferred embodiment of the present invention as viewed from the below.

In the first modification of the rotor core 40 of the fifth preferred embodiment, the rotor core 40 shown in FIGS. 21 and 22 has a connected laminate steel plate 45 in addition to the first laminate steel plate 41 and the second laminate steel plate 42. The connected laminate steel plate 45 is disposed at the lower end in the axial direction of the rotor core 40.

As shown in FIG. 22, the connected laminate steel plate 45 has connecting portions 45k as an intervening portion interposed between the connected base portion 45a and the connected piece portion 45c. Also, the intervening portion mentioned here includes, in addition to the connecting portion 45k, an outward projection provided in the connected base portion 45a, an inward projection provided in the connected piece portion 45c, and a configuration in which a space between the connected base portion 45a and the connected piece portion 45c is filled with a steel plate member.

According to this configuration, the magnet 32 inserted into the penetrating portion 41b and the penetrating portion 42b is caught by the intervening portion at the lower portion of the rotor core 40. Therefore, it is possible to prevent the magnet 32 from downwardly falling off the rotor core 40. Further, since the connected base portion 45a and the connected piece portion 45c are connected via the connecting portions 45k, it is possible to prevent the first base portion 41a and the piece portion 41c from being separated from each other and the second base portion 42a and the annular portion 42c from being separated.

As shown in FIG. 21, the second laminate steel plate 42 disposed at the axially upper end of the rotor core 40 has outward projections 42n. The outward projections 42n extend radially outward from the outer edge portion 42w of the second base portion 42a. A projecting length of the outward projection 42n is shorter than the radial width of the penetrating portion 42b. The magnet 32 is inserted into the penetrating portion 41b and the penetrating portion 42b below the second laminate steel plate 42 disposed at the axially upper end of the rotor core 40.

According to this configuration, the magnet 32 is caught by the outward projections 42n at the upper portion of the rotor core 40. Therefore, it is possible to prevent the magnet 32 from upwardly coming out of the rotor core 40.

Figure 23:
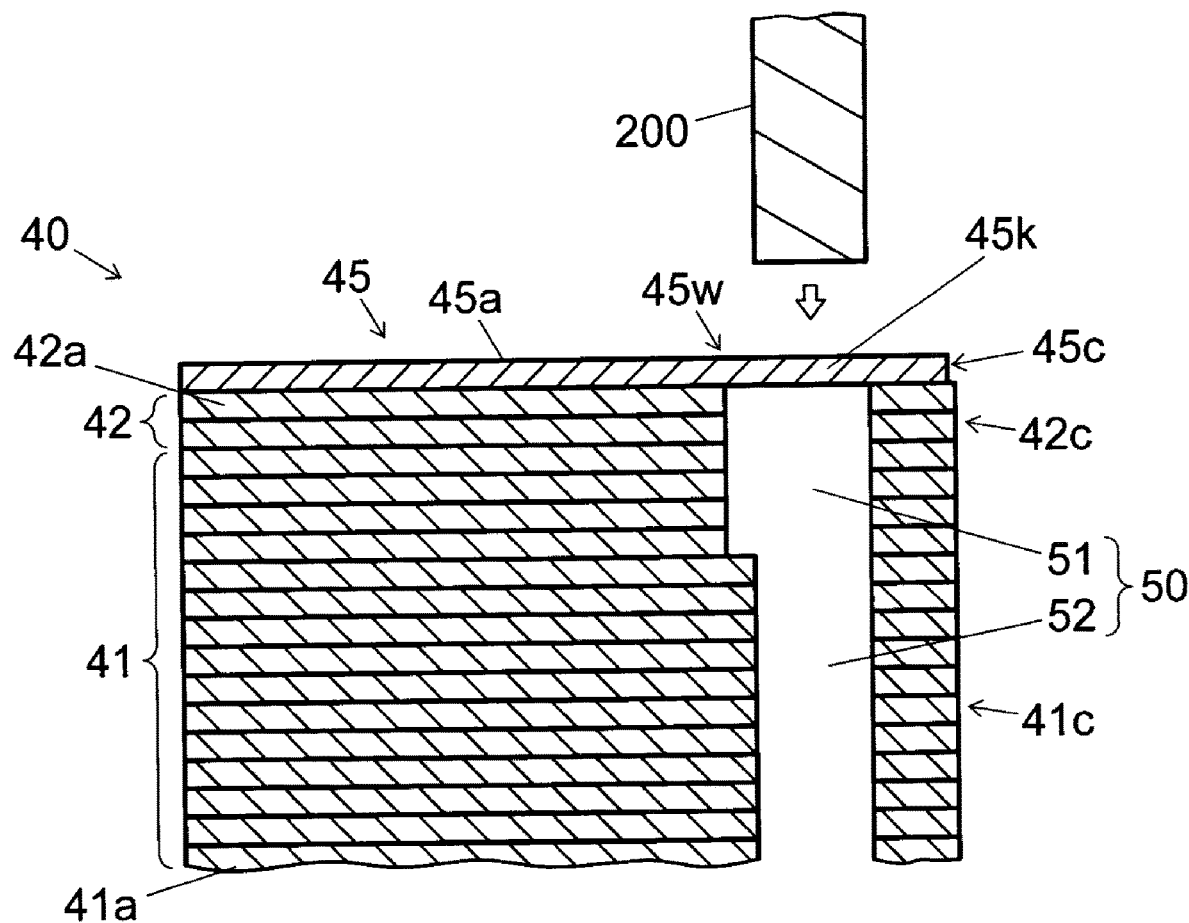
FIG. 23 is a longitudinal end view showing a first step of a manufacturing method of a second modification of the rotor core according to the fifth example embodiment of the present disclosure.
Figure 24:
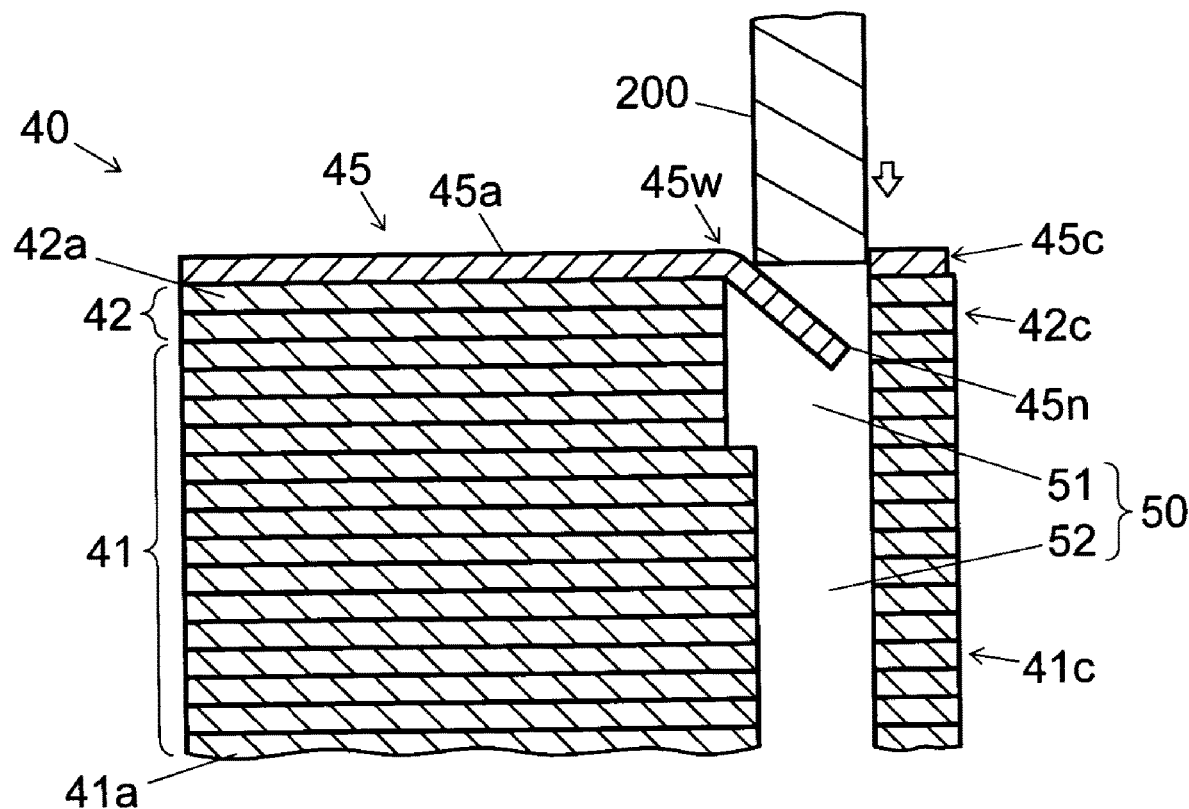
FIG. 24 is a longitudinal end view showing a second step of the manufacturing method of the rotor core according to the second modification of the fifth example embodiment of the present disclosure.
Figure 25:
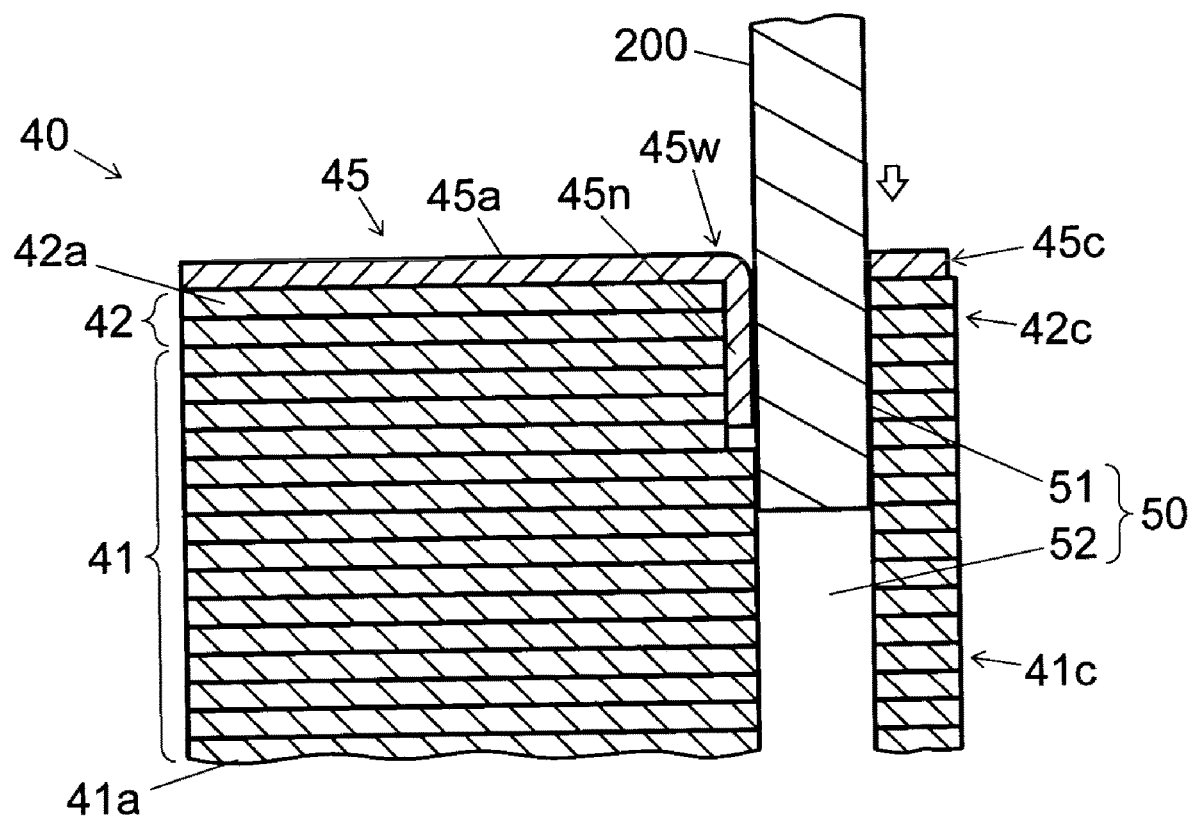
FIG. 25 is a longitudinal end view showing a third step of the manufacturing method of the second modification of the rotor core according to the fifth example embodiment of the present disclosure.

Subsequently, a second modification of the rotor core 40 of the fifth preferred embodiment will be described. FIG. 23 is a longitudinal end view showing a first step of the manufacturing method of the second modification of the rotor core according to the fifth preferred embodiment of the present invention. FIG. 24 is a longitudinal end view showing a second step of the manufacturing method of the second modification of the rotor core according to the fifth preferred embodiment of the present invention. FIG. 25 is a longitudinal end view showing a third step of the manufacturing method of the second modification of the rotor core according to the fifth preferred embodiment of the present invention.

In the second modification of the rotor core 40 of the fifth preferred embodiment, the connected laminate steel plate 45 is disposed at the upper end in the axial direction of the rotor core 40. Alternatively, in the second modification of the rotor core 40 of the fifth preferred embodiment, the connected laminate steel plate 45 is disposed at both the upper end and the lower end in the axial direction of the rotor core 40.

As shown in FIG. 25, the connecting portions 45k of the connected laminate steel plate 45 at the axially upper end is cut inward from the axially upper side of the connected laminate steel plate 45 with respect to the connected laminate steel plate 45 that is laminated. The cut connecting portions 45k are bent toward the inside of the penetrating portion 45b. In this way, by cutting the connecting portions 45k, the outward projections 45n can be formed. Also, inward projections may be formed by a similar cutting process.

The manufacturing method of the second modification of the rotor core 40 of the fifth preferred embodiment includes a process of laminating divided laminate steel plates in the axial direction. The divided laminate steel plate corresponds to the first laminate steel plate 41 in which the first base portion 41a and the piece portion 41c are divided in the radial direction. In this process, a plurality of first laminate steel plates 41 are laminated in the axial direction. In addition, the rotor core 40 also includes a plurality of second laminate steel plates 42 having a smaller number of laminated layers than the first laminate steel plates 41.

Next, the manufacturing method according to the second modification of the rotor core 40 of the fifth preferred embodiment includes a process of further laminating the connected laminate steel plate 45 to the first laminate steel plates 41 that ate laminated. In this process, the connected laminate steel plate 45, in which the connected base portion 45*a* and the connected piece portion 45*c* are connected via the connecting portions 45*k*, is laminated on the axially upper end of the first laminate steel plates 41 that are laminated. Further, in the manufacturing method of the second modification of the rotor core 40 of the fifth preferred embodiment, the connected laminate steel plate 45 (a intervened laminate steel plate) in which the connecting portions 45*k* as an intervening portion are interposed between the connected base portion 45*a* and the connected piece portion 45*c* is laminated on the axially lower end of the first laminate steel plates 41 that are laminated. In these lamination processes, the piece portion 41*c* of the first laminate steel plate 41 and the connected piece portion 45*c* of the connected laminate steel plate 45 overlap in the axial direction, and the first laminate steel plate 41 and the connected laminate steel plate 45 are laminated at a position where their outer edge portions are partially aligned.

Next, the manufacturing method of the second modification of the rotor core 40 of the fifth preferred embodiment includes a process of cutting the connecting portions 45*k* with a cutting member 200. In this process, the cutting member 200 is inserted into the penetrating portion 45*b* (not shown) of the connected laminate steel plate 45 shown in FIGS. 23, 24, and 25 to cut the connecting portions 45*k* with the cutting member 200. In this way, it is possible to eliminate the state in which the connected base portion 45*a* and the connected piece portion 45*c* are connected. Therefore, a flux barrier such as an air layer can be provided between the connected base portion 45*a* and the connected piece portion 45*c*. Thus, it is possible to reduce the magnetic flux loop.

The cutting member 200 shown in FIG. 23 is made of metal, for example, and is a rectangular parallelepiped body which has a rectangular substantially rectangular shape in a cross-section intersecting the axial direction and extends in the axial direction, similarly to the magnet 32. The magnet 32 may be used for the cutting member. In this way, it is possible to reduce the number of members to be used, and it is possible to reduce the number of processes until the rotor 3 is formed. Further, since the magnet 32 and the resin are in contact with each other, the fastening strength can be improved. In the first step of the cutting process for the connecting portion 45*k* shown in FIG. 23, the cutting member 200 is disposed axially above the position where a radially outer edge portion of the cutting member 200 coincides with a connection portion between the connecting portion 45*k* and the connected piece portion 45*c* in the radial direction of the rotor core 40.

Here, the rotor core 40 has a penetrating portion 50. The penetrating portion 50 is configured by the penetrating portion 41*b* of the first laminate steel plate 41 and the penetrating portion 42*b* of the second laminate steel plate 42 which mutually overlap in the axial direction, and extends in the axial direction.

The penetrating portion 50 has a first penetrating portion 51 and a second penetrating portion 52. The second penetrating portion 52 has a narrower radial width with respect to the first penetrating portion 51. The second penetrating portion 52 has a radial width that can accommodate only the magnet 32. The first penetrating portion 51 has a wider radial width with respect to the second penetrating portion 52. The first penetrating portion 51 has a radial width that can accommodate an outward projection 45*n*, which will be described later, in addition to the magnet 32.

The first penetrating portion 51 is formed at an upper portion of the rotor core 40 by a predetermined number of the penetrating portions 41*b* of first laminate steel plates 41 and the penetrating portions 42*b* of the second laminate steel plates 42 which are laminated adjacent to a lower surface of the connected laminate steel plate 45. The second penetrating portion 52 is formed by the penetrating portions 41*b* of the first laminate steel plates 41 and the penetrating portions 42*b* of the second laminate steel plates 42 at a position below the first laminate steel plates 41 and the second laminate steel plates 42 which are provided with the first penetrating portion 51.

In the second step of the cutting process of the connecting portion 45*k* shown in FIG. 24, the cutting member 200 descends and the connecting portion 45*k* is cut. The connecting portion 45*k* is cut at a portion connected to the connected piece portion 45*c*. The cut connecting portion 45*k* becomes the outward projection 45*n* of the connected base portion 45*a*. The outward projection 45*n* extends radially outward from the outer edge portion 45*w* of the connected base portion 45*a*. The outward projection 45*n* is bent toward the first penetrating portion 51 at a root portion of the connected base portion 45*a*.

In the third step of the cutting process of the connecting portion 45*k* shown in FIG. 25, the cutting member 200 further proceeds to be lowered, and a bent portion of the outward projection 45*n* is accommodated inside the first penetrating portion 51. After cutting the connecting portion 45*k* with the cutting member 200, the cutting member 200 is removed from the penetrating portion 50.

Next, the manufacturing method of the second modification of the rotor core 40 of the fifth preferred embodiment includes a process of inserting the magnet 32 into the penetrating portion 50. When the magnet 32 is used as the cutting member, the magnet 32 is inserted into the penetrating portion 50 after cutting the connecting portion 45*k*.

Also, when the connected laminate steel plate 45 is disposed at the axially lower end of the rotor core 40, the magnet 32 is brought into contact with an upper surface of the connecting portion 45*k*, which is the intervened portion of the connected laminate steel plate 45, at the axially lower end in a final step of insertion into the penetrating portion 50.

Next, the manufacturing method of the second modification of the rotor core 40 of the fifth preferred embodiment includes a process of forming the resin portion 34. In this process, the resin portion 34 is formed by pouring a synthetic resin, an adhesive agent or the like into the space portion 33.

In the rotor core 40 of the second modification of the fifth preferred embodiment, the connected laminate steel plate 45 disposed at the axially upper end has the outward projection 45*n* which extends radially outward from the outer edge portion 45*w* of the connected base portion 45*a*. According to this configuration, a flux barrier such as an air layer or a resin layer 34 can be provided between the connected base portion 45*a* and the connected piece portion 45*c* of the connected laminate steel plate 45. This makes it possible to more effectively utilize the magnetic flux of the magnet 32. Further, before forming the outward projection 45*n*, that is, before cutting the connecting portion 45*k*, it is possible to prevent the first base portion 41*a* and the piece portion 41*c* from being separated from each other and the second base portion 42a and the annular portion 42c from being separated.

In addition, instead of the outward projection 45n, the rotor core 40 may be provided with an inward projection extending radially inward from the inner edge portion of the connected piece portion 45c. Further, the rotor core 40 may be provided with both of the outward projection 45n and the inward projection.

Since the outward projection 45n is bent toward the penetrating portion 50, it presses the magnet 32 outward in the radial direction with its elastic force. Thus, the positioning of the magnet 32 can be performed in the radial direction. Further, it is possible to enhance the function of fixing the magnet 32 to the rotor core 40. In addition, the inward projection in the first modification and the outward projection 45n in the second modification may be combined. In this case, since the outward projection 45n is pressed radially outward, it can be caught by the inward projection and thus prevented from falling off.

Since a bent portion of the outward projection 45n is accommodated inside the first penetrating portion 51, it does not interfere with the insertion of the magnet 32 into the penetrating portion 50. Therefore, it is possible to secure a space for inserting the magnet 32 in the penetrating portion 50.

Also, the manufacturing method according to the second modification of the rotor core 40 of the fifth preferred embodiment may include a process of forming the thickness of the connecting portion 45k in the axial direction to be thinner than those of the connected base portion 45a and the connected piece portion 45c before the process of cutting the connecting portion 45k with the cutting member 200. According to this configuration, it is possible to easily cut the connecting portion 45k. For example, press working may be performed. According to this configuration, it is possible to obtain a configuration capable of easily cutting the connecting portion 45k by a simple processing method.

Also, the manufacturing method according to the second modification of the rotor core 40 of the fifth preferred embodiment may include a process of providing a notch in the connecting portion 45k before the process of cutting the connecting portion 45k with the cutting member 200. According to this configuration, it is possible to easily cut the connecting portion 45k. For example, push back processing may be performed. According to this configuration, it is possible to obtain a configuration capable of easily cutting the connecting portion 45k by a simple processing method.

Figure 26:
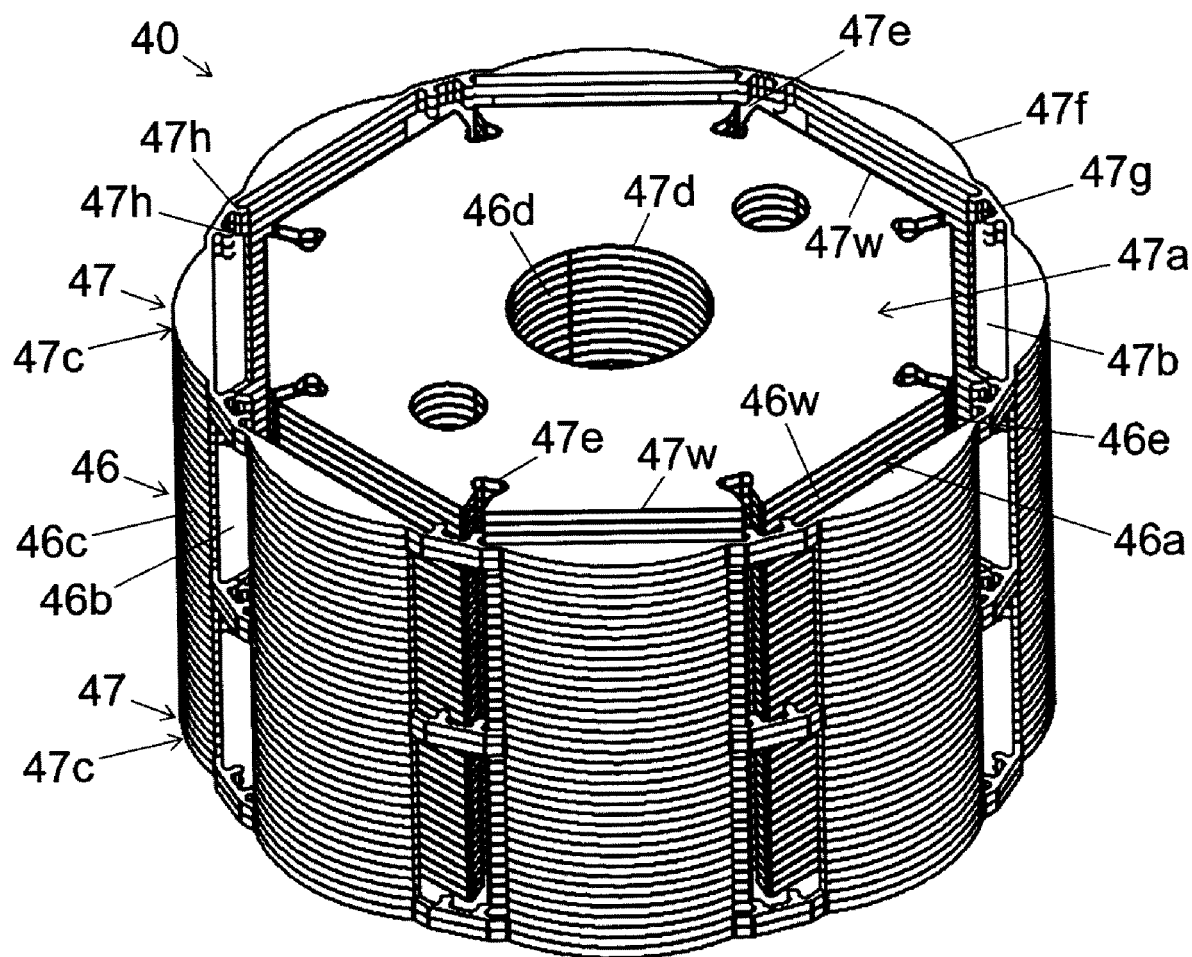
FIG. 26 is a perspective view of a rotor core of a motor according to a sixth example embodiment of the present disclosure as seen from above.
Figure 27:
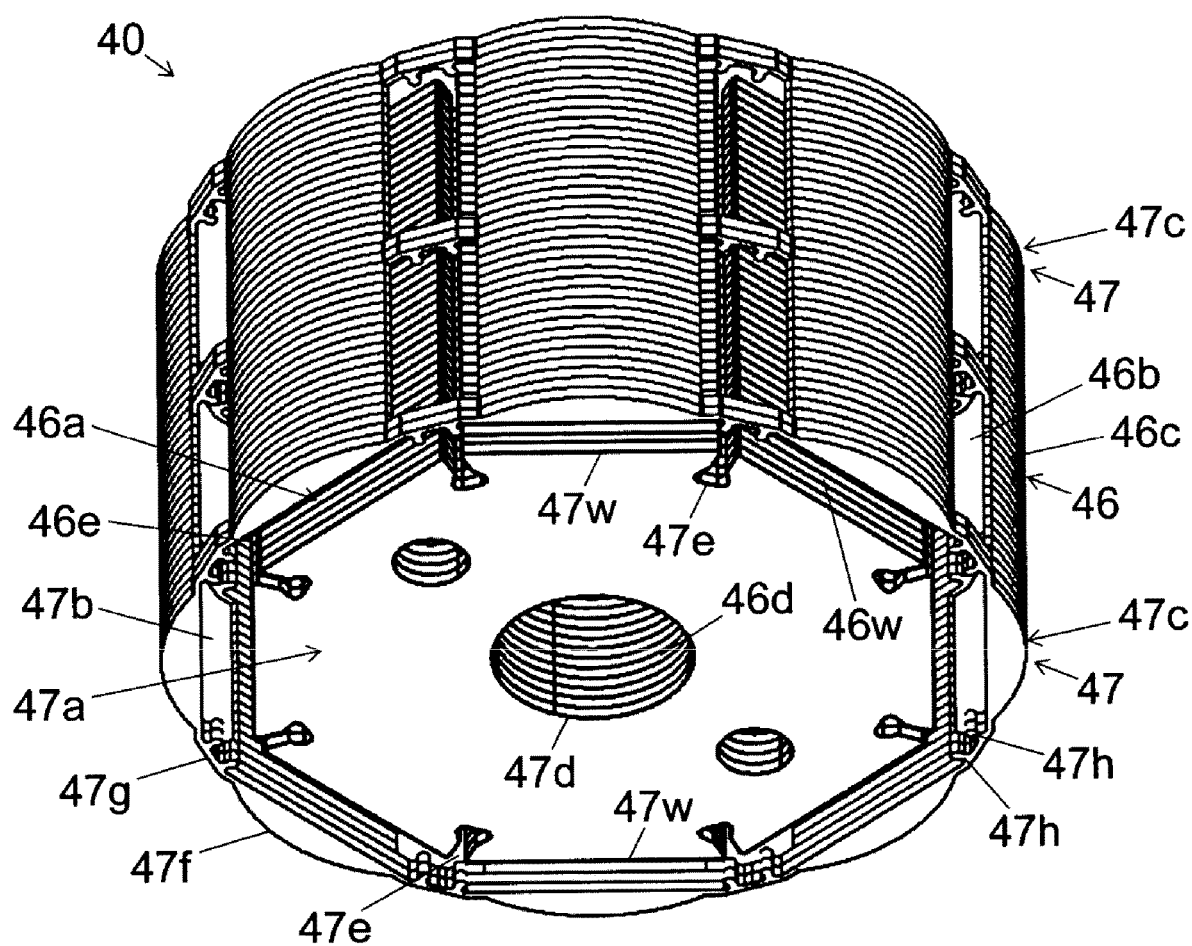
FIG. 27 is a perspective view of the rotor core of the motor according to the sixth example embodiment of the present disclosure as viewed from below.
Figure 28:
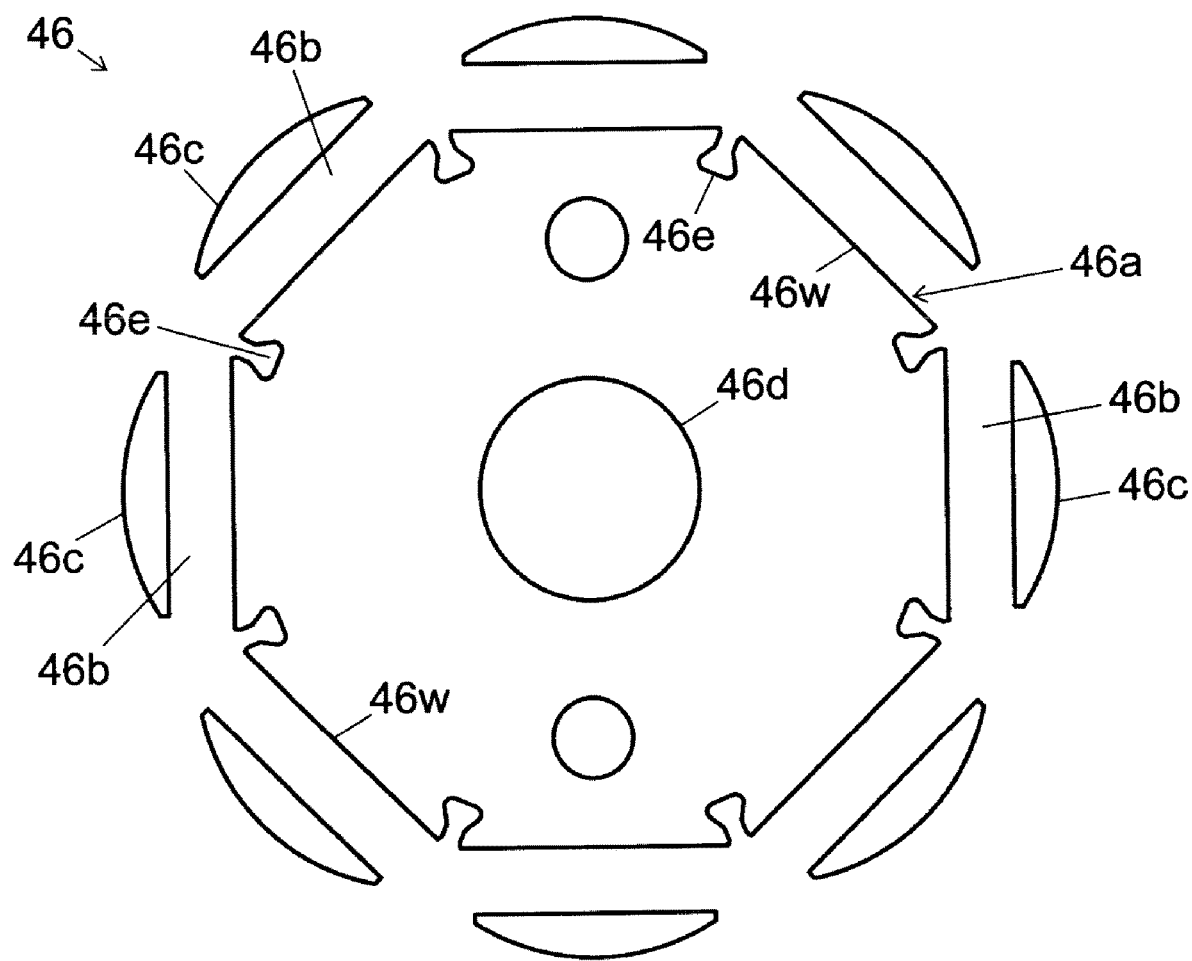
FIG. 28 is a plan view of a first laminate steel plate of the rotor core according to the sixth example embodiment of the present disclosure.
Figure 29:
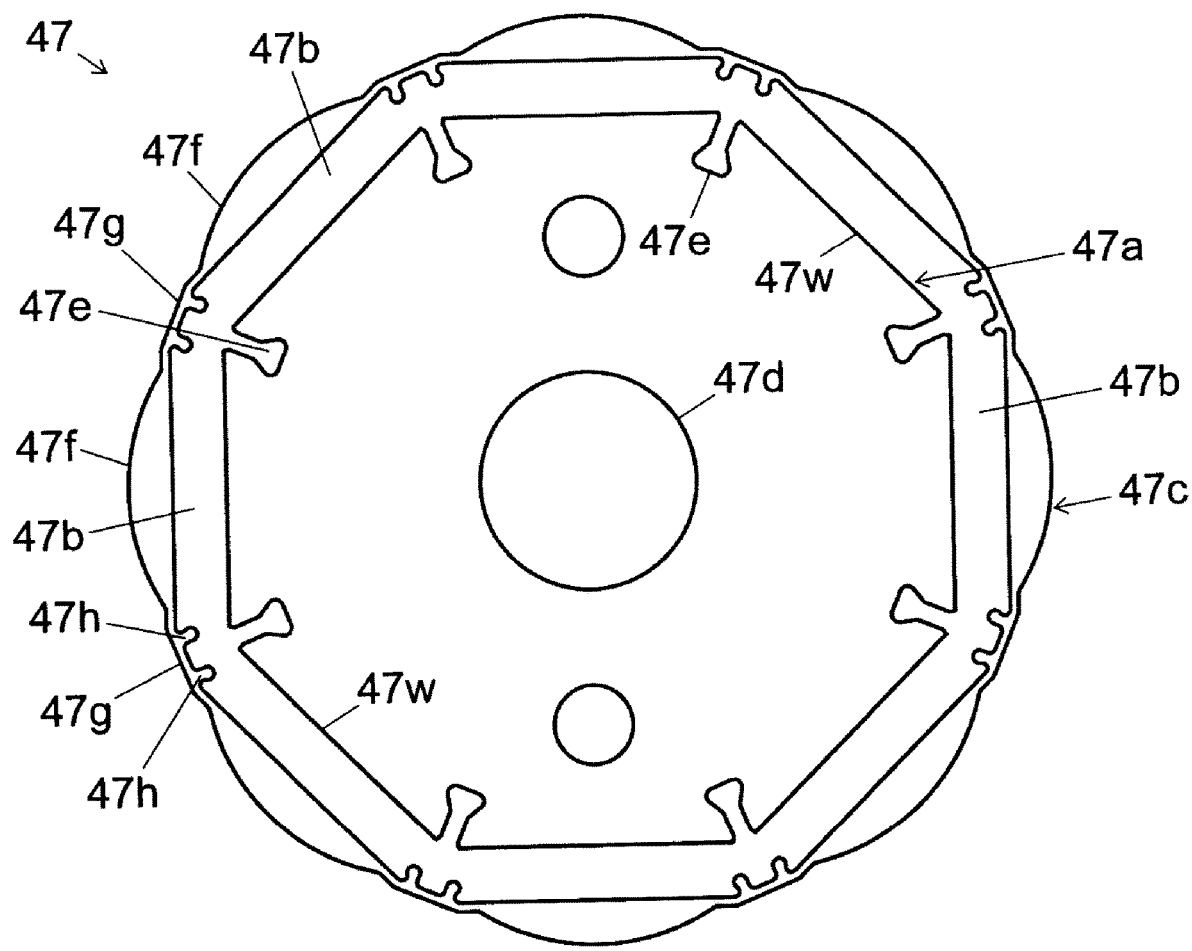
FIG. 29 is a plan view of a second laminate steel plate of the rotor core according to the sixth example embodiment of the present disclosure.

Next, a motor according to a sixth preferred embodiment of the present invention will be described. FIG. 26 is a perspective view of a rotor core of the motor according to the sixth preferred embodiment of the present invention as viewed from above. FIG. 27 is a perspective view of the rotor core of the motor according to the sixth preferred embodiment of the present invention as viewed from below. FIG. 28 is a plan view of a first laminate steel plate of the rotor core according to the sixth preferred embodiment of the present invention. FIG. 29 is a plan view of a second laminate steel plate of the rotor core according to the sixth preferred embodiment of the present invention. Since a basic configuration of this preferred embodiment is the same as that of the first preferred embodiment described above, constituent elements common to those in the first preferred embodiment are denoted by the same reference numerals or the same names as before, and explanation thereof may be omitted.

The rotor core 40 shown in FIGS. 26 and 27 has first laminate steel plates 46 and second laminate steel plates 47. Each of the first laminate steel plates 46 and the second laminate steel plates 47 expands in the radial direction with respect to the central axis of the rotor core 40.

The first laminate steel plate 46 shown in FIG. 28 has a first base portion 46a, penetrating portions 46b, and piece portions 46c. The first base portion 46a has a hole portion 46d and recessed portions 46e.

The second laminate steel plate 47 shown in FIG. 29 has a second base portion 47a, penetrating portions 47b, and annular portions 47c. The second base portion 47a has a hole portion 47d and recessed portions 47e. The annular portion 47c has a large diameter portion 47f and small diameter portions 47g which have different outer diameters.

The rotor core 40 shown in FIG. 26 and FIG. 27 is formed by laminating a plurality of first laminate steel plates 46 having the above-described structure and at least one second laminate steel plate 47 having the above structure in the axial direction. At this time, the piece portion 46c of the first laminate steel plate 46 and the large diameter portion 47f of the annular portion 47c of the second laminate steel plate 47 overlap in the axial direction, and the first laminate steel plate 46 and the second laminate steel plate 47 are laminated at a position where their outer peripheral edges are partially aligned.

According to this configuration, there is no region of a steel plate over the entire region in the circumferential direction between the first base portion 46a and the piece portions 46c of the first laminate steel plate 46 and between the second base portion 47a and the annular portions 47c of the second laminate steel plate 47. As a result, a flux barrier such as an air layer can be provided between the first base portion 46a and the piece portion 46c and between the second base portion 47a and the annular portion 47c. Therefore, it is possible to more effectively utilize the magnetic flux of the magnet 32.

Since the number of the second laminate steel plates 47 is smaller than the number of the first laminate steel plates 46, it is possible to suppress the amount of magnetic flux flowing through the annular portions 47c of the entire rotor core 40 as compared with the case where all of the rotor core 40 is formed by the second laminate steel plates 47. Therefore, the occurrence of magnetic saturation in the annular portion 47c is suppressed, so that the magnetic flux of the magnet 32 can be more effectively utilized.

When a synthetic resin, an adhesive or the like is poured on radially outer sides of the first base portion 46a and the second base portion 47a after inserting the magnet 32 into the penetrating portions 46b and 47b, the synthetic resin, adhesive or the like intrudes into the recessed portions 46e and 47e. Thus, it is possible to firmly fix the piece portion 46c, the annular portion 47c, and the magnet 32.

Figure 30:
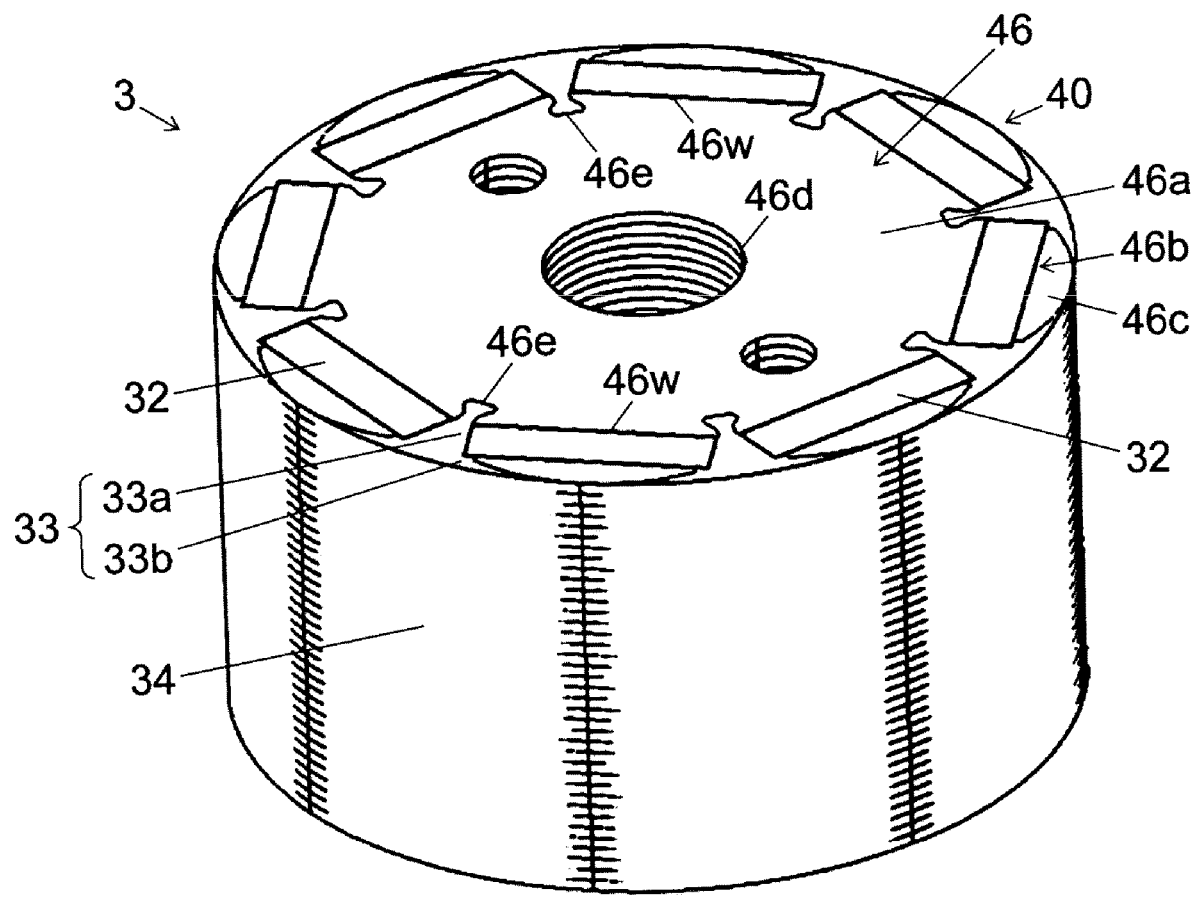
FIG. 30 is a perspective view of a rotor of a motor according to a seventh example embodiment of the present disclosure as viewed from above.
Figure 31:
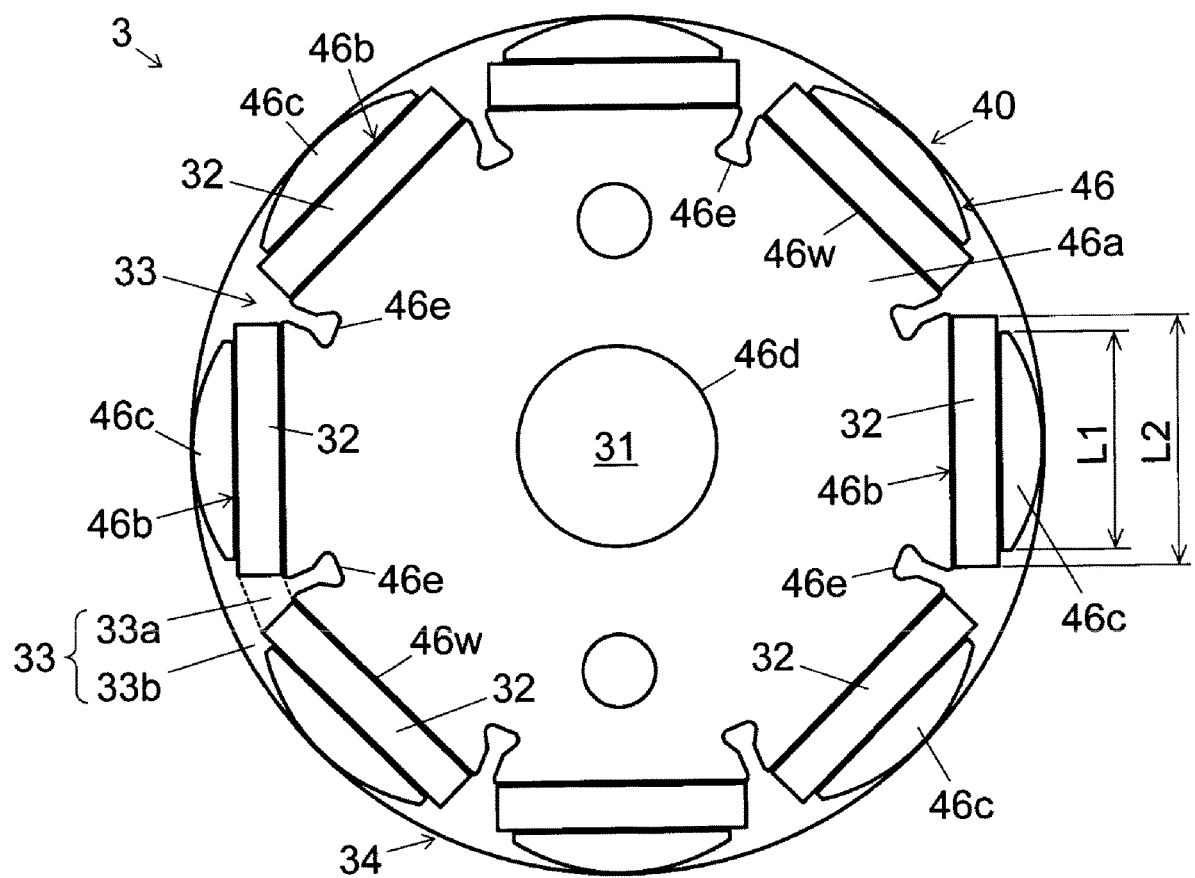
FIG. 31 is a plan view of the rotor of the motor according to the seventh example embodiment of the present disclosure.

Next, a motor according to an exemplary seventh preferred embodiment of the present invention will be described. FIG. 30 is a perspective view of a rotor of the motor according to the seventh preferred embodiment of the present invention as seen from above. FIG. 31 is a plan view of the rotor of the motor according to the seventh preferred embodiment of the present invention. Also, since a basic configuration of this preferred embodiment is the same as that of the first preferred embodiment described above, constituent elements common to the first preferred embodiment are denoted by the same reference numerals or same names as before, and explanation thereof may be omitted.

The rotor 3 shown in FIGS. 30 and 31 has a cylindrical or substantially cylindrical shape extending in the axial direction. The rotor 3 is disposed with a predetermined gap provided radially inside a stator 2 (see FIG. 1). The rotor 3 has a shaft 31 (not shown), a rotor core 40, magnets 32, and space portions 33 or resin portions 34.

The resin portion 34 is provided by injecting a synthetic resin, an adhesive agent or the like into the space portion 33. As a result, the resin portion 34 plays a role as a flux barrier. Further, since both circumferential ends of the magnet 32 contact the resin portions 34, it is possible to firmly fix the magnet 32 to the rotor core 40.

The rotor core 40 has first laminate steel plates 46. The first laminate steel plate 46 has a first base portion 46a, penetrating portions 46b, and piece portions 46c. The first base portion 46a has a hole portion 46d and recessed 46e.

The penetrating portion 46b is formed as a gap between the first base portion 46a and the piece portion 46c. The magnets 32 are provided one by one for each of eight penetrating portions 46b. Eight column portions 33a are disposed between adjacent penetrating portions 46b (magnets 32) in the circumferential direction and pass through the rotor core 40 in the axial direction.

A circumferential length L1 of the piece portion 46c shown in FIG. 31 is shorter than a circumferential length L2 of the magnet 32. According to this configuration, the magnetic characteristics related to a cogging torque can be improved. Therefore, it is possible to reduce the cogging torque. Furthermore, it is possible to suppress the generation of the magnetic flux loop inside the rotor core 40.

The recessed portion 46e is provided in an angular region with respect to the central axis between the piece portions 46c adjacent to each other in the circumferential direction. The recessed portion 46e is recessed radially inward from an outer edge portion 46w of the first base portion 46a. According to this configuration, when a synthetic resin, an adhesive or the like is poured on a radially outer side of the first base portion 46a after the magnet 32 is inserted between the first base portion 46a and the piece portion 46c, that is, the penetrating portion 46b, the synthetic resin, adhesive or the like intrudes into the recessed portion 46e. Thus, it is possible to firmly fix the piece portion 46c and the magnet 32.

Although the preferred embodiments of the present invention have been described above, the scope of the present invention is not limited thereto, and various modifications can be made without departing from the spirit of the invention. Further, the above preferred embodiments and modifications thereof can be arbitrarily combined as appropriate.

For example, although the annular portions 42c and 47c and the connected annular portion 43c described in the above preferred embodiments are annularly connected over the entire circumference, a part of them in the circumferential direction may be in a locally discontinued shape.

Further, in the second, third and fourth preferred embodiments, the connected laminate steel plate is arranged only at the lower end in the axial direction, the connected laminate steel plates may be disposed at both of the lower end and the upper end in the axial direction. In the case where the connected laminate steel plates are disposed at both of the lower end and the upper end in the axial direction, the connected laminate steel plates having different shapes may be disposed at the lower end and the upper end in the axial direction.

In addition, as the stator according to the preferred embodiment of the present invention, a stator such as a claw pole type is also applicable.

The present invention can be used, for example, in rotor cores, rotors, and motors.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A manufacturing method of a motor core in which a plurality of laminate steel plates extending in a radial direction with respect to a central axis are laminated in an axial direction, the method comprising:

laminating the laminate steel plates in the axial direction, each of the laminate steel plates including a base portion positioned on a radially outer side of the central axis, annular portions separately disposed on a radially outer side of the base portion with penetrating portions therebetween, and a plurality of connecting portions arranged at predetermined intervals in a circumferential direction to extend in the radial direction and connect the base portion and the annular portions, the annular portions including coupling portions adjacent to both circumferential sides of the connecting portions;

cutting at least one of two coupling portions adjacent to one of the plurality of connecting portions in the circumferential direction from an outer side to an inner side of the laminate steel plates in the radial direction with respect to the laminate steel plates that are laminated; and bending the at least one of the two coupling portions inward in the rail direction.

2. The manufacturing method of the motor core according to claim 1, wherein, in the cutting at least one of two coupling portions, two coupling portions adjacent to the one of the plurality of connecting portions in the circumferential direction are simultaneously cut.

3. The manufacturing method of the motor core according to claim 1, wherein, in the cutting at least one of two coupling portions, two coupling portions of the annular portion on circumferentially inner sides with respect to two of the plurality of connecting portions adjacent to each other in the circumferential direction are simultaneously cut.

4. The manufacturing method of the motor core according to claim 1, wherein, in the cutting the at least one of two coupling portions, two coupling portions disposed on sides opposite to each other with the central axis therebetween are simultaneously cut.

5. The manufacturing method of the motor core according to claim 1, further comprising removing the plurality of connecting portions.

6. A manufacturing method of a rotor core in which a plurality of laminate steel plates extending in a radial direction with respect to a central axis are laminated in an axial direction, the method comprising:

laminating the laminate steel plates in the axial direction, each of the laminate steel plates including a base portion positioned on a radially outer side of the central axis, annular portions separately disposed on a radially outer side of the base portion with penetrating portions therebetween, and a plurality of connecting portions arranged at predetermined intervals in a circumferential direction to extend in the radial direction and connect the base portion and the annular portions, the annular portions including coupling portions adjacent to both circumferential sides of the connecting portions;

cutting at least one of two coupling portions adjacent to one of the plurality of connecting portions in the circumferential direction from an outer side to an inner side of the laminate steel plates in the radial direction with respect to the laminate steel plates that are laminated; and bending the at least one of the two coupling portions inward in the radial direction.

7. A manufacturing method of a rotor including a rotor core in which a plurality of laminate steel plates extending in a radial direction with respect to a central axis are laminated in an axial direction, and a plurality of magnets are inserted into the rotor core, the method comprising:

laminating the laminate steel plates in the axial direction, each of the laminate steel plates including a base portion positioned on a radially outer side of the central axis, annular portions separately disposed on a radially outer side of the base portion with penetrating portions therebetween, and a plurality of connecting portions arranged at predetermined intervals in a circumferential direction to extend in the radial direction and connect the base portion and the annular portions, the annular portions including coupling portions adjacent to both circumferential sides of the connecting portions;

cutting at least one of two coupling portions adjacent to one of the plurality of connecting portions in the circumferential direction from an outer side to an inner side of the laminate steel plates in the radial direction with respect to the laminate steel plates that are laminated;

bending the at least one of the two coupling portions inward in the radial direction; and inserting the magnets into the penetrating portions.

* * * * *